US012184677B2

(12) United States Patent
dos Santos et al.

(10) Patent No.: US 12,184,677 B2
(45) Date of Patent: *Dec. 31, 2024

(54) FRAMEWORK FOR INVESTIGATING EVENTS

(71) Applicant: FORESCOUT TECHNOLOGIES, INC., San Jose, CA (US)

(72) Inventors: Daniel Ricardo dos Santos, Rotterdam (NL); Elisa Costante, Eindhoven (NL); Mario Dagrada, Eindhoven (NL); Alessandro Manzi, Eindhoven (NL)

(73) Assignee: Forescout Technologies, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/241,663

(22) Filed: Sep. 1, 2023

(65) Prior Publication Data

US 2023/0421581 A1 Dec. 28, 2023

Related U.S. Application Data

(63) Continuation of application No. 16/729,015, filed on Dec. 27, 2019, now Pat. No. 11,818,146.

(51) Int. Cl.
*H04L 9/40* (2022.01)
*H04L 41/0604* (2022.01)

(52) U.S. Cl.
CPC ...... *H04L 63/1416* (2013.01); *H04L 41/0609* (2013.01); *H04L 63/1425* (2013.01); *H04L 63/1433* (2013.01)

(58) Field of Classification Search
CPC ............. H04L 63/1416; H04L 41/0609; H04L 63/1425; H04L 63/1433; H04L 63/1408
See application file for complete search history.

(56) References Cited

U.S. PATENT DOCUMENTS 8,056,130 B1 11/2011 Njemanze et al.
10,122,748 B1 * 11/2018 Currie ................ H04L 63/1433
(Continued)

FOREIGN PATENT DOCUMENTS

WO 2017100534 A1 6/2017
WO 2021133479 A1 7/2021

OTHER PUBLICATIONS

International Search Report by International Searching Authority for PCT/US2020/060167, mailed Feb. 24, 2021; pp. 11.
(Continued)

*Primary Examiner* — Joseph P Hirl
*Assistant Examiner* — Thomas A Gyorfi
(74) *Attorney, Agent, or Firm* — Womble Bond Dickinson (US) LLP

(57) ABSTRACT

A method includes accessing events associated with a network and determining an issue based on a correlation of a portion of the events, wherein the issue represents an incident associated with the portion of the events, and wherein the correlation of the portion of the events is based on information associated with the network and at least in part on an event type of the portion of the events. A priority associated with the issue is determined at least based on the event type of the portion of the events. A first event type that is associated with an operational technology (OT) entity has a higher priority than a second event type that is not associated with the OT entity. Data associated with the issue is stored.

20 Claims, 14 Drawing Sheets

(56) References Cited

U.S. PATENT DOCUMENTS

| | | |
|---|---|---|
| 2002/0078381 A1* | 6/2002 | Farley .................... H04L 43/00 |
| | | 726/23 |
| 2004/0193943 A1 | 9/2004 | Angelino et al. |
| 2013/0307682 A1 | 11/2013 | Jerhotova et al. |
| 2015/0106941 A1 | 4/2015 | Muller et al. |
| 2017/0171231 A1 | 6/2017 | Reybok et al. |
| 2017/0318050 A1* | 11/2017 | Hassanzadeh ...... H04L 63/1433 |
| 2018/0349482 A1 | 12/2018 | Oliner et al. |
| 2019/0327251 A1* | 10/2019 | Muddu ................... H04L 63/20 |

OTHER PUBLICATIONS

John Worthington. "Event Correlation: Why, What, and How" Published Jul. 10, 2017 (4 pages) https:www.eginnovations.com/blog/what-is-event-correlation/ (Year: 2017).

* cited by examiner

FRAMEWORK FOR INVESTIGATING EVENTS

CROSS REFERENCE TO RELATED APPLICATIONS

This application is a continuation of U.S. patent application Ser. No. 16/729,015 filed Dec. 27, 2019, the contents of which is hereby incorporated by reference in its entirety.

TECHNICAL FIELD

Aspects and implementations of the present disclosure relate to network monitoring, and more specifically, analysis of events on a network.

BACKGROUND

As technology advances, the number and variety of devices that are connected to communications networks are rapidly increasing. Each device may have its own respective vulnerabilities which may leave the network open to compromise or other risks. Preventing the spreading of an infection of a device or an attack through a network can be important for securing a communication network.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Figure 1:
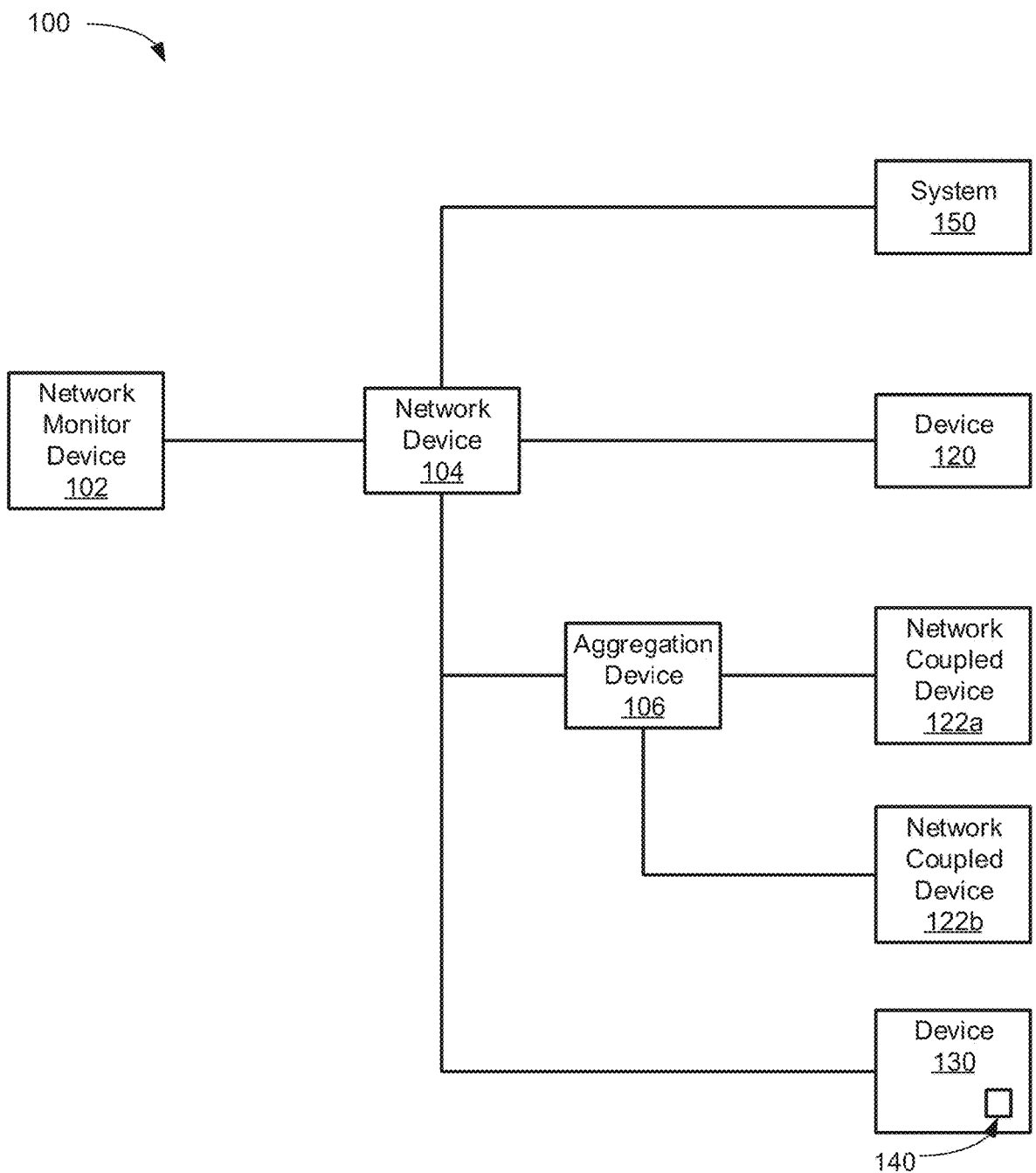
FIG. 1 depicts an illustrative communication network in accordance with one implementation of the present disclosure.

Aspects and implementations of the present disclosure are directed to events on a network (but may be applicable in other areas). The systems and methods disclosed can be employed with respect to network security and operations, among other fields. More particularly, it can be appreciated that devices with vulnerabilities are a significant and growing problem. At the same time, the proliferation of network-connected devices (e.g., operational technology (OT) and internet of things (IoT) devices such as televisions, security cameras, wearable devices, medical devices, etc.) can make it difficult to effectively ensure that network security is maintained.

In large and complex networks, intrusion detection systems (IDSes) can generate tens of thousands of security events within a day. Until recently, this problem affected mostly corporate information technology (IT) networks with large volumes of traffic. Operational technology (OT) and industrial networks, traditionally smaller and more isolated, are becoming increasingly connected and starting to face similar problems. However, in the OT space the context and implications of this problem are different due to the peculiarity of OT networks and their potentially physical consequences in case of incidents.

These potentially physical consequences mean that indicator of compromises and anomalies need to be detected as soon as possible. Use of multiple detection techniques (signature and anomaly based) is necessitated to cover the growing threat landscape. The multiple detection techniques can lead to a large number of alerts or events which can overload or flood a user with too much information.

For example, the multiple detection techniques might lead to thousands of alerts raised in a single day. Further, the number of alerts increases with the increase in sites being monitored. The large number of alerts makes it challenging to find the right details to focus on to address threats.

Moreover, it is difficult for a user to connect and correlate alerts with each other. Useful contextual information typically comes from different tools and it's difficult to integrate the information from the different tools. In addition, attack descriptions (e.g., signatures) may be imprecise and also cover acceptable behaviors of the monitored information system, or the implementation may not conform to the specification and known attacks could go undetected. Current intrusion detection systems do not make it easy for users to logically group related events and usually treat each event source separately.

The main problems preventing correct alert interpretation include the following: there are often vendor specific many to one processes, common in the OT domain, log data overload allows for intruders to bypass those monitoring the system, high rate for false positives with present intrusion systems, often caused by anomaly-based techniques, inside attacks are difficult to recognize as a malicious attack or not, and maximizing utilization of existing security infrastructure.

IT analysts are typically IT oriented and have lots of challenges dealing with OT events since they do not possess the capabilities and knowledge of how OT processes work. For example, security analysts typically lack OT knowledge and OT specific tools often fails to make specific OT knowledge easily accessible. IT analysts may further have difficulty communicating with OT engineers that oversee the operations of OT systems. OT engineers are typical in the field and have different priorities than IT analysts. This gap in interests and knowledge between IT and OT departments can create clashes between IT and OT departments.

One of the main challenges for network analysts is to single out, among the large volume of data, the events related to actual incidents. In the OT space, this is even more difficult since the analyst needs to further understand whether the events are security-related (e.g., an attempted attack) or operational related (e.g., OT assets being reconfigured or appearing in the network for the first time). While an in-depth analysis by a user can identify the root cause of incidents, the type of knowledge required to accomplish this task is very difficult to acquire. This is especially relevant for OT networks where an IT analyst has very limited to no knowledge of the network design and devices on the network. This problem is exacerbated by an IDS generating a large number of OT-specific alerts and other events.

Large numbers of alerts and events leads to alert or event flood or overload where the number of alerts is unmanageable or overwhelming. Making the situation worse is that IDSes often fail to contextualize these events into meaningful information. The problematic large number of events, coupled with the usually limited knowledge analysts possess of the OT space, make it hard to understand whether an event can represent a real incident to the operational continuity of the system. In turn, this greatly limits the usability of these tools for threat hunting and incident response in OT networks.

With millions of events possibly being generated in a short period of time, the severity of these events can range from critical to informational, with critical events hard to find among the other events. While a decent analysis can identify the root cause of failures, this type of knowledge is expensive or challenging to obtain as the users (e.g., analysts) do not always have a good context over the data. Embodiments are able to use event correlation algorithms to obtain interrelations between ongoing events, in a more cost effective manner. The final outcome is an increased efficiency of the analyst, and in turn, a better response and mitigation of incidents and threats.

The correlation process may derive new information by identifying dependencies or associations among data. The correlation can then provide insights that cannot be inferred from single alert or single source of data (e.g., a single location).

Embodiments able to identify and detect industrial control system specific threat indicators. Risk score and advanced aggregation and correlation techniques can be used to select the right focus points. In the case of potential incident, relevant contextual information is stored and available for investigation. Incidents may be responded to via integrations with security information and event management (SIEM) systems, security orchestration, automation and response (SOAR) systems, and network access control.

The risk score of an entity can be based on a risk framework that is designed to identify the entities that deserve the most analyst attention. For example, the risk framework described in U.S. patent Ser. No. 16/454,729, entitled Comprehensive Risk Assessment, may be used. This may be based on the security risk and operational risk associated with an entity.

The risk score of an entity may be defined as the likelihood of an event happening multiplied by the impact of the event for each type of risk considered. The types of risk, used in computing the risk score, can include cyber-security or cyber-attack risk and operational failure risk. The cyber-attack likelihood factors can include alerts, vulnerabilities, direct connectivity with a public entity (in other words, exposure to and from the Internet), and proximity to infected/vulnerable entities. The likelihood of operational failure can be based on alerts indicating operational malfunction, misconfiguration, and misuse, among others. For example, the risk of an entity may be based on a severity of alerts associated with the entity, whether the entity has Internet connectivity, the proximity of the entity to other infected entities.

The cyber-attack impact can be based on entity criticality (e.g., how critical an entity is), network criticality (e.g., how an entity is networked with one or more critical entities or whether it is located in a mission-critical area of the network), and proximity to critical devices (e.g. how many "hops" it would require an attacker to move laterally from this device to a critical one). The operational failure impact can be based on entity criticality and network criticality. The resulting risk score is a more powerful metric that allows users to prioritize a response based on the probability of something happening (e.g., vulnerabilities, connectivity to public entities, proximity to infected entities), current evidence of something happening (e.g., alerts), and the impact of the problem or threat.

Embodiments may be part of a system that has detection functionality, triage functionality, investigation functionality, and response functionality. The detection functionality may include a threat library (e.g., an OT specific threat library), anomaly detection functionality, and functionality to detect vulnerabilities and indicators of compromise. The triage functionality, may include various embodiments, may include entity risk score functionality (e.g., automatic risk score determination), functionality to map a threat to a security taxonomy (e.g., common security taxonomy, for instance MITRE ATT&CK), and alert aggregation and correlation functionality, as described herein.

The investigation functionality, may include embodiments, may include functionality for contextually enriched incident investigation, graph based exploration, and time-based infection spreading analysis. The response functionality may include automatic response functionality (e.g., without involvement of user, for instance, isolation of a rogue device), functionality to refine network access control and segmentation, functionality to integrate with SIEM and SOAR platforms.

Embodiments are designed to make life simpler and the interactions between two different parts of an organization and infrastructure. Embodiments address long standing problem of communication between operational personnel and security analysts, which are common in a plant or critical infrastructure environments. By addressing this problem, embodiments allow IT people to communicate with OT engineers in a more effective manner.

Embodiments provide a general framework to address the problem of too many alerts and events without contextualization. Based on data analysis, embodiments move from single point events to issues. An event is an observable occurrence in an information system that happened at some point in time. An issue is a collection of related events (e.g., alerts, network log entries, change log entries, etc.) and may further include contextual information (e.g., entities related to the events), vulnerabilities (e.g., of entities associated with the events), and risk (e.g., associated with entities associated with the events). The way events are related in an issue can be defined in multiple manners, e.g., manually by a user or with some automatic algorithms which already expose pre-defined issues to the user. For example, an alert, an entry in a network log, and an entry in a host change log can be events. An issue can have multiple events. Through the determination of issue, embodiments may substantially reduce the number of data points exposed to a user by showing only high priority issues from which are user can start to investigate a possible incident, starting from the most potentially urgent.

Embodiments can determine a flexible, graph-based data model that embeds OT-specific knowledge. In some embodiments, embodiments may access a data model determined by another system. In some embodiments, a correlation engine implements algorithms that are based on OT alerts and events can identify the presence of possible operational issues or threats. Embodiments can further provide visualization of these issues which enables investigation of the issues in-depth with available data.

A graph-based data model can be used to contextualize the data (e.g., OT data) collected and expose the relationships connecting different elements together. This resolves problems because data related to an issue (e.g., alerts, network events, vulnerabilities, etc.) is stored in separate databases, repositories, locations, etc., which makes their relationships harder to visualize and their run-time correlation computationally more costly.

Embodiments are able to determine a data model of the network based on knowledge of the network and entities of the network. This can include scenario based leveraging of previously defined scenarios of attack and attaches new alerts to those scenarios if relevant through the algorithm. The data model can include information about the network. This can thereby allow conceptualization of the OT network data. The data model may further embed information of the processes (e.g., OT processes) on the network and semantics within it. The embedded information may be information that that a security analyst is not aware of. For example, how some processes within a plant are working and the entities involved. Embodiments are able to put into relations of different concepts that different parts of the model that would not be interrelated if there were no knowledge of how a plant or OT environment works. In some embodiments, the model may embed information of how an OT network is functioning in operation.

For example, operations that often happen in a network can include a change in the logic of a controller that directly impact the process of a plant. This change of the logic can trigger multiple events (e.g., the network monitor entity can see that a controller stopped working, that it's firmware has been updated, that it was not responding for a while and then it restarted). The model can embed the fact that these events together refer to a change in the controller process and additional evidence (e.g., whether anomalies are detected or not) that can help in determining whether this change to the process is benign or malicious.

The data model may be determined and constructed to reflect relationships between entities in the graph, e.g., relationships between entities with specific relationships within an OT environment. For example, the model may include information that an engineering workstation is controlling four PLC devices on a network. The engineering workstation controlling the four PLC devices would be more important than other engineering workstations that are not controlling other entities. The data model may thus include information of the complexities of the network and allow for building a general framework for conceptualizing with network (e.g., OT networks).

The model may further include how entities are related to each other (e.g., client server relationship, how they are communicating, etc.) and what information the entities are sharing or communicating. The model further includes how entities are related (e.g., asset network maps). For example, two entities can have different kinds of relationships, for instance "communicate" if the entities exchange generic messages or "reconfigure" if one entity sends reconfiguration messages to another entity (e.g., an engineering workstation to a PLC). The data model may further include vulnerabilities of some entities within the network, the priority of the vulnerability (e.g., based on the risk or potential impact of the vulnerability), what entities the vulnerable entities are communicating with, and the protocols being used.

In some embodiments, the data model may further include information of attacks, how comprises spread, etc. For example, the data model may include information that the use of Telnet proceeds authentication attempts to take control of other entities on a network as part of turning the other entities into part of a network of bots or remotely controlled entities.

A correlation component, e.g., correlation engine, of embodiments can use the data model to gather multiple alerts and other events to determine an issue. This can greatly reduce the problem of too many alerts being generated which can affect other systems (e.g., OT-specific IDSes). This allows a user (e.g., a security analyst) to more effectively understand, prioritize, and respond to issues coming from the OT network.

Event correlation functionality of embodiments can receive alerts from heterogenous IDSes and reduce false alerts, detect high level patterns of attacks, increase the meaning of occurred incidents, predict the future states of attacks, and detect the root cause of attacks. This can be achieved by aggregating alerts to reduce alert flooding and provide filtered alerts to be correlated for concrete and meaningful pattern recognition of incidents.

Event correlation can produce a more succinct overview of the security and operational activity of the network. This is may be achieved by suppressing events that do not provide useful information, aggregating events that refer to the same incident or filtering duplicative events. Event correlation can encompass several correlation operations. These operations can differ in the operations executed over various types of events. In some embodiments, several operations can be combined to provide more complex event correlation patterns.

In some embodiments, alerts, network logs, change logs and other information sources may be accessed, the data normalized, anonymized, filtered, aggregated, correlated, ranged and prioritized, or a combination thereof. Alert correlation algorithms can be roughly divided into categories including similarity based algorithms (e.g., simple or hierarchical rules, machine learning based approaches), knowledge based algorithms, and statistical based algorithms (e.g., analysis of event repetition patterns to correlate with occurred incidents).

In some embodiments, issues may be determined using algorithms designed and implemented based on how industrial networks work in practice. Embodiments may thus be able to correlate events not only based on security problems, but also identity malfunctioning and potentially dangerous operations on OT assets, e.g., industrial controllers. The algorithms can be used to obtain interrelations between ongoing events, in a much more cost-effective manner than manual aggregation.

The relationships in the model between entities can be used correlate, aggregate, or a combination thereof events to determine an issue. As described herein, an issue can include multiple events, alerts, etc., that are related and the number of issues significantly less than the number of events, alerts, etc. Focusing on an issue allows a user or analyst to focus on issues instead of the analyst having to determine an interrelation between many different events, thus reducing the effort of the analyst.

In some embodiments, the correlation component is configured to correlate events by leveraging information of the network (e.g., OT network, IT network, etc.). The correlation component may correlate alerts related to a process in a network within an OT network together. For example, events related to a reconfiguration of a network controller can be correlated together. The events can include when one network controller is configured, a message is sent through the network to change its firmware configuration.

Alerts for specific protocols may be correlated by the correlation component. For example, alerts associated with Telnet protocol which is an insecure protocol can be correlated to show the spread of an attack or attempted attack. The Telnet related alerts can be grouped into a single issue or incident. The correlation engine may be configured to correlate events from groups of entities or from a single entity.

Embodiments are further able to correlate events beyond security, for instance, malfunctioning and dangerous operations. Embodiments can detect a reconfiguration of an entity, which can be a potentially dangerous operation, based on how OT networks and controllers work. For example, when a PLC, functioning as an industrial controller in a plant, has its firmware changed by an operator or an attacker can be a dangerous operation. The configuration change can be quite dangerous because it might impact how a plant, refinery, or power distribution system is functioning. The reconfiguration of the PLC can change its behavior of the physical system that it is controlling thereby having a potentially dangerous physical effect. Reconfiguration could also cause a mechanical device to function outside of normal operating parameters, e.g., speed. Stuxnet malware is an example of where a reconfiguration resulted in centrifuges operating at unsafe speeds and were severely damaged.

Embodiments can further identify networking issues or problems that are hampering an entity from communicating within a network. For example, embodiments may determine an issue that a PLC or other controller is experiencing a problem communicating based on identifying a certain number of events that are happening (e.g., due to a drop in communications over time) and based on the protocols being used, embodiments can determine an entity is having a problem communicating. The problem in communication could be due an actual malfunction of the entity or could be due to an attack that is trying to disrupt operation of the entity (e.g., a distributed denial-of-service (DDOS) attack). Both cases are potentially dangerous for the continuity of operations.

Embodiments are further able to determine an issue based on the appearance of a rogue host or entity, which is an entity that was not present in the network before and is performing some potentially dangerous operations (e.g., changing a configuration of another entity, sending large amounts of requests, using insecure protocols, etc.). Embodiments may identify an issue related to a rogue entity based on the network model not having a record of the rogue entity prior to it joining the network and the rogue entity reconfiguring entities known to be related together and not having previously communicated with the entities.

Embodiments are further able to associate a priority with issue. For example, the correlation engine may use information from the data model including the edges of the graph relationship and information of the relationships between various entities on the network to prioritize different entities within the network. The priority allows a user (e.g., analyst) to focus on the highest priority issues first. In some embodiments, the priority is based on a scale from information to critical, thereby allowing a user to focus on the most critical issues first. The priority of an issue can be based on a variety of factors, including the severity of an event (e.g., high security risk or high operational risk of the event source entity), the number of vulnerabilities, IOCs and other related information associated with the one or more entities associated with the issue, the risk associated with each entity that is associated with the issue, and the types of events associated with the issue. The factors can be used to determine a prioritization score. For example, certain types of events, for instance events related to the operations of the controllers will have a higher priority than other events that based on the data model are less important for plant operation.

In some embodiments, if each of the events composing the issue have a high severity, then the issue will be marked as high priority. High risk events (e.g., events whose source or destination are associated with a high risk score) and a high number of the vulnerabilities (e.g., above a threshold, for instance, a customized or predefined threshold) can contribute to an issue being high priority.

For example, if there is an issue associated with reconfiguration and a malfunction issue, the reconfiguration will be prioritized more because the reconfiguration is related to a change in a controller, which could have more potentially dangerous consequences, while the malfunction issue does not. The events related to the reconfiguration are determined to be more important than the event related to the malfunction. The issue related to reconfiguration will thus be prioritized higher than the malfunction issue.

As another example, if one or more entities associated with a reconfiguration issue have one or more vulnerabilities, then the reconfiguration issue associated with one or more entities with one or more vulnerabilities can be prioritized higher than a reconfiguration issue associated with one or more entities that do not have associated vulnerabilities.

In some embodiments, correlation of events may be based, in part, on aggregation of events. Aggregation of events can be based on events having the same or similar event types, sources, destinations, protocols, or a combination thereof. Events with similar event types, sources, destinations, protocols, or combination thereof can be considered similar. In various embodiments, machine learning (e.g., unsupervised machine learning) may be used to determine whether events are similar and whether events should be aggregated.

In some embodiments, the aggregation includes a similarity based approach. For example, this can include clustering alerts with the same port number and MAC address if the alerts exceed a time window threshold). If the threshold is exceeded, the alerts are aggregated. As another example, an IP address of a victim entity (e.g., based on a signature match) and a specific port where the traffic hits a maximum can be selected to correlate a number of alerts. Checks for an inside attacker can be detected based on the correlation of the source IP address and destination IP address class or subnet.

In some embodiments, the similarity based approach may include three phases. The first phase may include clustering alerts if attributes overlap. The purpose of this phase is to cluster alerts that are part of the same ongoing attack. The second phase may aggregate data for similar monitoring fields (e.g., areas of a network), while similar alert names are maintained. The purpose of this phase is to ensure the detection of same attack is merged when detected by multiple monitoring entities (e.g., network monitoring device 102). The third phase may include merging events of similar attack class in alerts and comparing to a threshold. The purpose this phase is to merger alerts for a higher level view of an attack.

In some embodiments, an alert correlation matrix is used as shown in table I below. To reduce computational complexity, some alerts may be filtered out based on attributes and then fed into the alert correlation matrix. C(a1, a2) and C(a2, a1) represents two different temporal relationships. C(a1, a2) suggests that alert a2 arrives after a1, while C(a2, a1) indicates that alert a2 arrives before a1. By distinguishing these two situations, a better understanding of the relationship of these two types of attacks can be gained.

TABLE I

Alert Correlation Matrix
Alert correlation matrix

|    | a1       | a2       | a3       | a4       | a5       |
|----|----------|----------|----------|----------|----------|
| a1 | C(a1,a1) | C(a1,a2) | C(a1,a3) | C(a1,a4) | C(a1,a5) |
| a2 | C(a2,a1) | C(a2,a2) | C(a2,a3) | C(a2,a4) | C(a2,a5) |
| a3 | C(a3,a1) | C(a3,a2) | C(a3,a3) | C(a3,a4) | C(a3,a5) |
| a4 | C(a4,a1) | C(a4,a2) | C(a4,a3) | C(a4,a4) | C(a4,a5) |
| a5 | C(a5,a1) | C(a5,a2) | C(a5,a3) | C(a5,a4) | C(a5,a5) |

A: set of alerts, w: weight causality threshold

1. For each alert Ai ∈ A do
2. {
3.    For each alert Aj ∈ A with Aj.Time ⇐ Ai.Time do {
4.       If ( W(Aj,Ai)>=w )
      then {
5.          If ((Ai.Target-IP = Aj.Target-IP) OR (Aj.Target-IP = Aj.Source-IP))
         then
6.            Connect Aj to Ai
         }
   }

TABLE I-continued

Alert Correlation Matrix
Alert correlation matrix

}
7. Draw attack scenarios

In some embodiments, alert flooding is prevented by reducing the number of events based on volume-based filtering and time stamp aggregation. Alerts may be grouped based on alerts which are higher in number of occurrences. The alerts may then be filtered based on alerts that are from entities that are down (e.g., offline) along with checking the periodicity of alerts. In various embodiments, an alert is generated upon a threshold number of entities or hosts being down, e.g., as part of a denial-of-service (DDoS) attack and then optionally starting correlation (e.g., including aggregation).

In some embodiments, multiple alert floods may be clustered. To cluster two alert floods, the alert floods may be accessed and a ratio of events in one alert flood compared to the events in both alert floods is determined. Events that do not in both floods can be excluded from the clustering of the alert floods. In various embodiments, an alarm log can be processed for flood detection, then a distance or ratio (e.g., aforementioned ratio) can be computed, and then the alert floods clustered.

In some embodiments, events may be grouped based on severity. The severity based grouping of events may be based on static filtering of alerts including filtering out alerts with low severity and high occurrence, while keeping the filtered out alerts in a database for forensic analysis. While the individual severity of each event might not be enough to warrant specific analysis, the grouping of alerts may reveal trends and associations that clarify the intentions of an attacker. In various embodiments, a weighted sum of severity of alerts in a time window, use of a threshold for the sum, and correlation of the sums may be used to determine if a particular severity-based grouping of alerts is relevant or important.

In various embodiments, events may be grouped based on bucketing. The bucketing approach may include temporal splitting of events into a bucket of periodic events or periodic group and a bucket of sporadic events or sporadic group. Periodic events and non-periodic (e.g., sporadic) events may be categorized separately. Events associated with blacklisted credentials, weak security protocols, failed connections, and compliance issues may be bucketed or grouped together. Buckets can be used for simple correlation between threat intelligence data, e.g., blacklisted IP addresses and periodic events. This allows increasing the severity associated with an event when a destination IP address of a periodic event is blacklisted.

Embodiments are thus able to group many different types of events into an issue based information about the network and various information within the events so that a user can view issues, which are much smaller in quantity than the number of events. Embodiments thus reduce the amount of extraneous information or noise.

After correlation of the alerts, events, etc., into an issue, the issue can be displayed. Embodiments can display, render, etc., an issue as a relationship graph to allow the inspection of details of the issue, events, etc. Various elements may also be automatically aggregated based on different criteria to reduce the amount of information to visualize. For example, criteria could include a counter to summarize each of the events that occur between two specific entities.

Leveraging the visualizations, a user (e.g., analyst) is free to explore all available data and identify the root cause of the issue in a more effective manner. FIGS. 4-11 show example graphical user interfaces (GUIs) for the graph-based data model allowing an analyst to investigate the details (e.g., alerts, other network events, vulnerabilities, associated risks, etc.) of an issue.

Embodiments provide a comprehensive framework to streamline investigation of network security and operational incidents, with a special applicability to OT and industrial environments or networks. The correlation of events delivers great benefits to the security analysts' workflow by accelerating selection and prioritization of the available information. The unified data model coupled with graph-based visualization greatly improves contextualization and investigation of issues (e.g., including correlated events). Embodiments further allow for detailed review of issues at various points in time, helping the analyst to extract the root cause of both potential attacks and operational problems in networks (e.g., including OT networks).

Embodiments can enhance the offerings of network monitoring tools and are effective and easy to integrate with existing security platforms and analyst workflows. Embodiments may also be integrated into other areas beyond network monitoring.

The correlation of events into issues delivers benefits to security analyst workflows by speeding up selection, prioritization, and the presentation of relevant information. Embodiments further allow more direct communication with the OT team/engineering because the issues categorized as operations will be forwarded to the people in field in order to be looked at. This can also speed up the selection and prioritization of security issues but also increase the bidirectional communication with the OT people in a company.

The unified data model coupled with graph based visualization improves contextualization and allows exploring the full set of data available from a detection system in OT environments, which is often not accessible as a whole because of the complexity. While a lot of data is often put out by an intrusion detection system, the contextualization and exploration of the full dataset is often quite cumbersome. Embodiments solve this problem.

Accordingly, described herein in various implementations are systems, methods, techniques, and related technologies, which enable correlation of events to reduce or prevent event flooding or overwhelm. The correlation of events into issues allows focus on high importance or impact issues while reducing user event analysis workloads. High importance or impact issue may thus be responded to in much more efficient manner.

Advantageously, embodiments are configured for reducing or preventing event flooding by correlating events into issues, which reflect high level occurrences (e.g., attacks) on a network. The issues may further be categorized (e.g., as security or operational) and prioritized (e.g., critical, high, medium, low, informational) to allow ranking of issues. Embodiments thus enable more effective response to events.

Accordingly, described herein in various implementations are systems, methods, techniques, and related technologies, which enable event correlation. As described herein, improved classification can be enabled by the determination of recommendations to enable more data, including properties, to be available for classification.

It can be appreciated that the described technologies are directed to and address specific technical challenges and longstanding deficiencies in multiple technical areas, including but not limited to network security, monitoring, and policy enforcement. It can be further appreciated that the described technologies provide specific, technical solutions to the referenced technical challenges and unmet needs in the referenced technical fields.

An entity or entities, as discussed herein, include devices (e.g., computer systems, for instance laptops, desktops, servers, mobile devices, IoT devices, OT devices, healthcare devices, financial devices, etc.), network devices or infrastructure (e.g., firewall, switch, access point, router, enforcement point, etc.), endpoints, virtual machines, services, serverless services (e.g., cloud based services), containers (e.g., user-space instances that work with an operating system featuring a kernel that allows the existence of multiple isolated user-space instances), cloud based storage, accounts, and users. Depending on the entity, an entity may have an IP address (e.g., a device) or may be without an IP address (e.g., a serverless service).

Enforcement points including firewalls, routers, switches, cloud infrastructure, other network devices, etc., may be used to enforce segmentation on a network (and different address subnets may be used for each segment) and restricting communications between one or more network portions. Enforcement points may enforce segmentation by filtering or dropping packets according to the network segmentation policies/rules.

The enforcement points may be one or more network devices (e.g., firewalls, routers, switches, virtual switch, hypervisor, SDN controller, virtual firewall, etc.) that are able to enforce access or other rules, ACLs, or the like to control (e.g., allow or deny) communication and network traffic (e.g., including dropping packets) between the entity and one or more other entities communicatively coupled to a network. Access rules may control whether an entity can communicate with other entities in a variety of ways including, but not limited to, blocking communications (e.g., dropping packets sent to one or more particular entities), allowing communication between particular entities (e.g., a desktop and a printer), allowing communication on particular ports, etc. It is appreciated that an enforcement point may be any device that is capable of filtering, controlling, restricting, or the like communication or access on a network.

Operational Technology (OT) can include devices from a wide variety of industries, including, but not limited to, medical systems, electrical systems (e.g., power generation, power distribution, and other power utility devices and infrastructure), oil and gas plants, mining facilities, manufacturing systems, water distribution systems, chemical industry systems, pharmaceutical systems, infrastructure systems (e.g., used with roads, railways, tunnels, bridges, dams and buildings), and other industrial control systems.

FIG. 1 depicts an illustrative communication network 100, in accordance with one implementation of the present disclosure. The communication network 100 includes a network monitor device 102, a network device 104, an aggregation device 106, a system 150, devices 120 and 130, and network coupled devices 122*a-b*. The devices 120 and 130 and network coupled devices 122*a-b* may be any of a variety of devices or entities including, but not limited to, computing systems, laptops, smartphones, servers, Internet of Things (IoT) or smart devices, supervisory control and data acquisition (SCADA) devices, operational technology (OT) devices, campus devices, data center devices, edge devices, etc. It is noted that the devices of communication network 100 may communicate in a variety of ways including wired and wireless connections and may use one or more of a variety of protocols.

Network device 104 may be one or more network devices configured to facilitate communication among aggregation device 106, system 150, network monitor device 102, devices 120 and 130, and network coupled devices 122*a-b*. Network device 104 may be one or more network switches, access points, routers, firewalls, hubs, etc.

Network monitor device 102 may be operable for a variety of tasks including accessing network traffic, determining events based on the network traffic, correlating events, determining issues based on the correlation of events, determining a category associated with an issue (e.g., security or operational), determining a priority associated with an issue (e.g., based on the severity associated with an issue), displaying a list of issues, and receiving selection of an issue. Network monitor device 102 may further display details of a selected issue and allow review of various details associated with an issue over various points in time (e.g., FIGS. 4-6 and 8-11). In some embodiments, network device monitor 102 may access events determined by another entity or device (e.g., an intrusion detection system, system 150).

Network monitor device 102 is thus able to enable a user (e.g., analyst) to avoid an overload or flood of events and avoid having to analyze a large number of events determine the context of events and a high level understanding of events. Network monitor 102 can help a user focus in on the most important issue, e.g., based on priority, and communicate events to other parts of a business. For example, a security analyst viewing output from network monitor device 102 may forward an issue categorized as operational to an OT engineer. This can thereby enable the business to operate more efficiently with less risk and downtime.

Network monitor device 102 may further perform a variety of operations including identification, classification, and taking one or more remediation actions (e.g., changing network access of an entity, changing the virtual local area network (VLAN), sending an email, sending a short message service (SMS) message, active actions, passive actions, etc.), as described herein.

Network monitor device 102 may be a computing system, network device (e.g., router, firewall, an access point), network access control (NAC) device, intrusion prevention system (IPS), intrusion detection system (IDS), deception device, cloud-based device, virtual machine based system, etc. Network monitor device 102 may be an enforcement point including, but not limited to, a router, firewall, switch, hypervisor, software-defined networking (SDN) controller, virtual firewall, a next generation firewall (NGFW), cloud infrastructure, or other network device or infrastructure device.

Network monitor device 102 may be communicatively coupled to the network device 104 in such a way as to receive network traffic flowing through the network device 104 (e.g., port mirroring, sniffing, acting as a proxy, passive monitoring, etc.). In some embodiments, network monitor device 102 may include one or more of the aforementioned devices. In various embodiments, network monitor device 102 may further support high availability and disaster recovery (e.g., via one or more redundant devices).

In some embodiments, network monitor device 102 may monitor a variety of protocols (e.g., Samba, hypertext transfer protocol (HTTP), secure shell (SSH), file transfer protocol (FTP), transfer control protocol/internet protocol (TCP/IP), user datagram protocol (UDP), Telnet, HTTP over secure sockets layer/transport layer security (SSL/TLS), server message block (SMB), point-to-point protocol (PPP), remote desktop protocol (RDP), windows management instrumentation (WMI), windows remote management (WinRM), proprietary protocols, OT specific protocols, for instance, Modbus, DNP3, BACnet, IEC-104, STEP7, MMS, Goose, etc.).

The monitoring of entities by network monitor device 102 may be based on a combination of one or more pieces of information including traffic analysis, information from external or remote systems (e.g., system 150), communication (e.g., querying) with an aggregation device (e.g., aggregation device 106), and querying the entity itself (e.g., via an API, CLI, web interface, SNMP, etc.), which are described further herein. Network monitor device 102 may be operable to use one or more APIs to communicate with aggregation device 106, device 120, device 130, or system 150. Network monitor device 102 may monitor for or scan for entities that are communicatively coupled to a network via a NAT device (e.g., firewall, router, etc.) dynamically, periodically, or a combination thereof.

Information from one or more external or 3$^{rd}$ party systems (e.g., system 150) may further be used for determining one or more tags or characteristics for an entity. For example, a vulnerability assessment (VA) system may be queried to verify or check if an entity is in compliance and provide that information to network monitor device 102. External or 3$^{rd}$ party systems may also be used to perform a scan or a check on an entity to determine a software version.

Device 130 can include agent 140. The agent 140 may be a hardware component, software component, or some combination thereof configured to gather information associated with device 130 and send that information to network monitor device 102. The information can include the operating system, version, patch level, firmware version, serial number, vendor (e.g., manufacturer), model, asset tag, software executing on an entity (e.g., anti-virus software, malware detection software, office applications, web browser(s), communication applications, etc.), services that are active or configured on the entity, ports that are open or that the entity is configured to communicate with (e.g., associated with services running on the entity), media access control (MAC) address, processor utilization, unique identifiers, computer name, account access activity, etc. The agent 140 may be configured to provide different levels and pieces of information based on device 130 and the information available to agent 140 from device 130. Agent 140 may be able to store logs of information associated with device 130. Network monitor device 102 may utilize agent information from the agent 140. While network monitor device 102 may be able to receive information from agent 140, installation or execution of agent 140 on many entities may not be possible, e.g., IoT or smart devices.

System 150 may be one or more external, remote, or third party systems (e.g., separate) from network monitor device 102 and may have information about devices 120 and 130 and network coupled devices 122*a-b*. System 150 may include a vulnerability assessment (VA) system, a threat detection (TD) system, endpoint management system, a mobile device management (MDM) system, a firewall (FW) system, a switch system, an access point system, etc. Network monitor device 102 may be configured to communicate with system 150 to obtain information about devices 120 and 130 and network coupled devices 122*a-b* on a periodic basis, as described herein. For example, system 150 may be a vulnerability assessment system configured to determine if device 120 has a computer virus or other indicator of compromise (IOC).

The vulnerability assessment (VA) system may be configured to identify, quantify, and prioritize (e.g., rank) the vulnerabilities of an entity. The VA system may be able to catalog assets and capabilities or resources of an entity, assign a quantifiable value (or at least rank order) and importance to the resources, and identify the vulnerabilities or potential threats of each resource. The VA system may provide the aforementioned information for use by network monitor device 102.

The advanced threat detection (ATD) or threat detection (TD) system may be configured to examine communications that other security controls have allowed to pass. The ATD system may provide information about an entity including, but not limited to, source reputation, executable analysis, and threat-level protocols analysis. The ATD system may thus report if a suspicious file has been downloaded to a device being monitored by network monitor device 102.

Endpoint management systems can include anti-virus systems (e.g., servers, cloud based systems, etc.), next-generation antivirus (NGAV) systems, endpoint detection and response (EDR) software or systems (e.g., software that record endpoint-system-level behaviors and events), compliance monitoring software (e.g., checking frequently for compliance).

The mobile device management (MDM) system may be configured for administration of mobile devices, e.g., smartphones, tablet computers, laptops, and desktop computers. The MDM system may provide information about mobile devices managed by MDM system including operating system, applications (e.g., running, present, or both), data, and configuration settings of the mobile devices and activity monitoring. The MDM system may be used get detailed mobile device information which can then be used for device monitoring (e.g., including device communications) by network monitor device 102.

The firewall (FW) system may be configured to monitor and control incoming and outgoing network traffic (e.g., based on security rules). The FW system may provide information about an entity being monitored including attempts to violate security rules (e.g., unpermitted account access across segments) and network traffic of the entity being monitored.

The switch or access point (AP) system may be any of a variety of network devices (e.g., network device 104 or aggregation device 106) including a network switch or an access point, e.g., a wireless access point, or combination thereof that is configured to provide an entity access to a network. For example, the switch or AP system may provide MAC address information, address resolution protocol (ARP) table information, device naming information, traffic data, etc., to network monitor device 102 which may be used to monitor entities and control network access of one or more entities. The switch or AP system may have one or more interfaces for communicating with IoT or smart devices or other devices (e.g., ZigBeem, Bluetooth™, etc.), as described herein. The VA system, ATD system, and FW system may thus be accessed to get vulnerabilities, threats, and user information of an entity being monitored in real-time which can then be used to determine a risk level of the entity.

Aggregation device 106 may be configured to communicate with network coupled devices 122*a-b* and provide network access to network coupled devices 122*a-b*. Aggregation device 106 may further be configured to provide information (e.g., operating system, entity software information, entity software versions, entity names, application present, running, or both, vulnerabilities, patch level, etc.) to network monitor device 102 about the network coupled devices 122*a-b*. Aggregation device 106 may be a wireless access point that is configured to communicate with a wide variety of devices through multiple technology standards or protocols including, but not limited to, Bluetooth™, Wi-Fi™, ZigBee™, Radio-frequency identification (RFID), Light Fidelity (Li-Fi), Z-Wave, Thread, Long Term Evolution (LTE), Wi-Fi™ HaLow, HomePlug, Multimedia over Coax Alliance (MoCA), and Ethernet. For example, aggregation device 106 may be coupled to the network device 104 via an Ethernet connection and coupled to network coupled devices 122*a-b* via a wireless connection. Aggregation device 106 may be configured to communicate with network coupled devices 122*a-b* using a standard protocol with proprietary extensions or modifications.

Aggregation device 106 may further provide log information of activity and properties of network coupled devices 122*a-b* to network monitor device 102. It is appreciated that log information may be particularly reliable for stable network environments (e.g., where the types of devices on the network do not change often). The log information may include information of updates of software of network coupled devices 122*a-b*.

Figure 2:
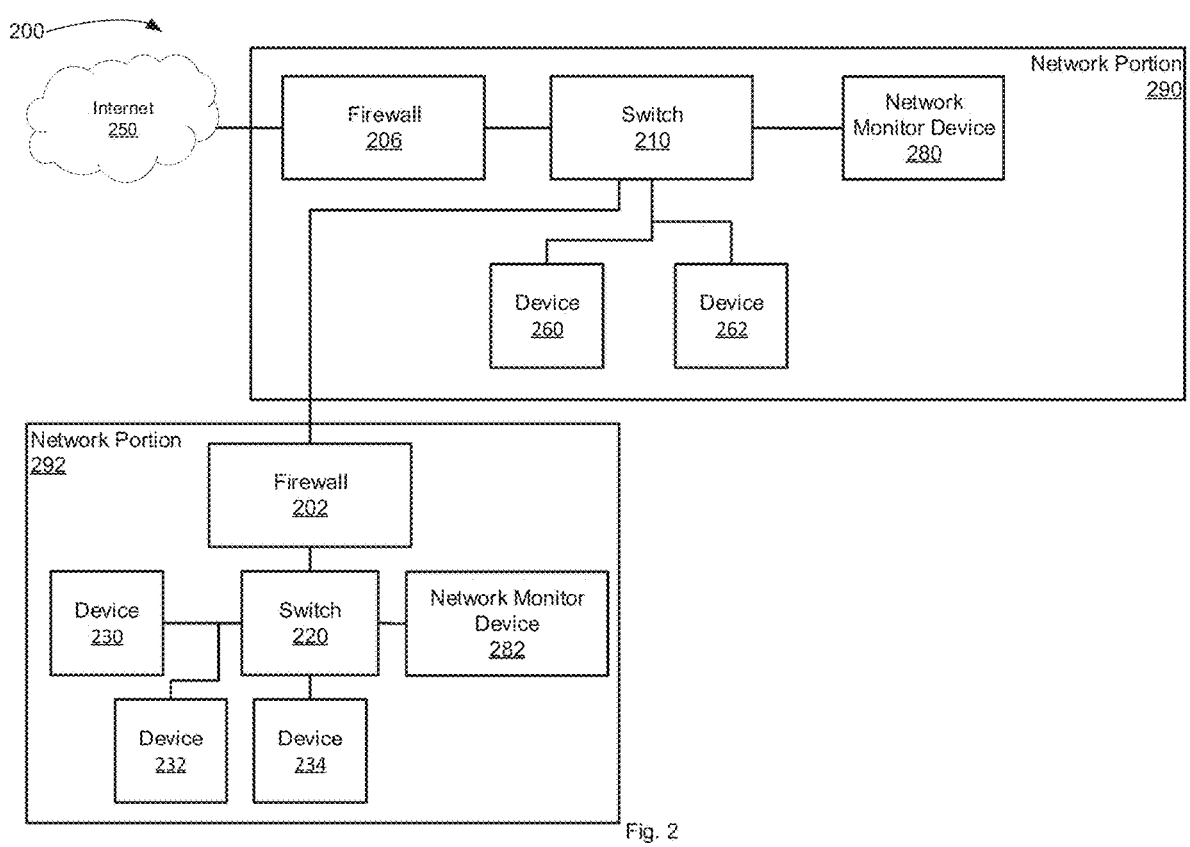
FIG. 2 depicts an illustrative network topology in accordance with one implementation of the present disclosure.

FIG. 2 depicts an illustrative network topology in accordance with one implementation of the present disclosure. FIG. 2 depicts an example network 200 with multiple enforcement points (e.g., firewalls 202-206 and switches 210-220) and a network monitor devices 280-282 (e.g., network monitor device 102) which can perform issue determination, as described herein, associated with the various entities communicatively coupled to example network 200. Network monitor devices 280-282 can further determine one or more events based on the communications of entities of network 200, as described herein.

FIG. 2 shows example devices 230-262 (e.g., devices 106, 122*a-b*, 120, and 130, other physical or virtual devices, other entities, etc.) and it is appreciated that more or fewer network devices or other entities may be used in place of the devices of FIG. 2. Example devices 230-262 may be any of a variety of devices or entities (e.g., OT devices, IoT devices, IT devices, etc.), as described herein. Enforcement points including firewalls 202-206 and switches 210-220 may be any entity (e.g., network device 104, cloud infrastructure, etc.) that is operable to allow traffic to pass, drop packets, restrict traffic, etc. Network monitor devices 280-282 may be any of a variety of network devices or entities, e.g., router, firewall, an access point, network access control (NAC) device, intrusion prevention system (IPS), intrusion detection system (IDS), deception device, cloud-based device or entity, virtual machine based system, etc. Network monitor devices 280-282 may be substantially similar to network monitor device 102. Embodiments support IPv4, IPv6, and other addressing schemes. In some embodiments, network monitor devices 280-282 may be communicatively coupled with firewalls 202-206 and switches 210-220 through additional individual connections (e.g., to receive or monitor network traffic through firewalls 202-206 and switches 210-220).

Switches 210-220 communicatively couple the various devices of network 200 including firewalls 202-206, network monitor devices 280-282, and devices 230-262. Firewalls 202-206 may perform network address translation (NAT) and firewall 202 may communicatively couple the devices 230-234, which are behind the firewall 202, with network monitor device 280, switch 210, and firewall 206.

Firewall 206 communicatively couples network 200 to Internet 250 and firewall 206 may restrict or allow access to Internet 250 based on particular rules or ACLs configured on firewall 206. Firewalls 202-206 and switches 210-220 are enforcement points, as described herein.

Network monitor devices 280-282 are configured to access network traffic (e.g., via port mirroring or SPAN ports of firewalls 202-206 and switches 210-220), determine events based on the network traffic, correlate events, determine issues based on the correlation of events, determine a category associated with an issue (e.g., security or operational), determine a priority associated with an issue (e.g., based on the severity associated with an issue), display a list of issues, and receive selection of an issue. Network monitor devices 280-282 may further display details of a selected issue and allow review of various details associated with an issue over various points in time (e.g., FIGS. 4-6 and 8-11, as described herein. Network monitor devices 280-282 can perform passive scanning of network traffic by observing and accessing portions of packets from the network traffic of network 200. Network monitor devices 280-282 may perform an active scan of an entity of network 200 by sending one or more requests to the entity of network 200. The information from passive and active scans of entities of network 200 can be used to classify the entity of network 200 and determine other entity associated information (e.g., vulnerabilities, risk posture, etc.) which can be for event correlation, as described herein.

As shown, network 200 includes network portions 290-292. Network portions 290-292 may be VLANs, SSIDs, segments, subnetworks, etc. Network monitor devices 280-282 may determine issues relevant to their local network portions 290-292 (e.g., based on data available on each of the network portions 290-292, etc.) or remote network portions (e.g., network portion 292 for network monitor device 280, as described herein.

For example, if device 234 is an PLC and device 230 sends commands to download new firmware, network monitor device 282 may determine an issue based on the events associated with the multiple communications between devices 230 and 234 involved in the download of new firmware. This issue may be reported to a user as a potentially dangerous reconfiguration.

As another example, if device 230 becomes infected with a botnet malware, it may send communications to device 232 which are unique to the botnet malware, e.g., blacklisted login credentials. Device 232 as part of being infected with the botnet malware may attempt to communicate with a blacklisted public IP address. The communications, e.g., with the blacklisted public IP address and blacklisted login credentials, can be determined to be events by network monitor device 282. Network monitor device 282 can then correlate the events and display to a user a single issue identifying the botnet malware infection. This enables the user to focus in on that the infection instead of having to sort through the many other events that may be occurring on network portion 292.

Figure 3:
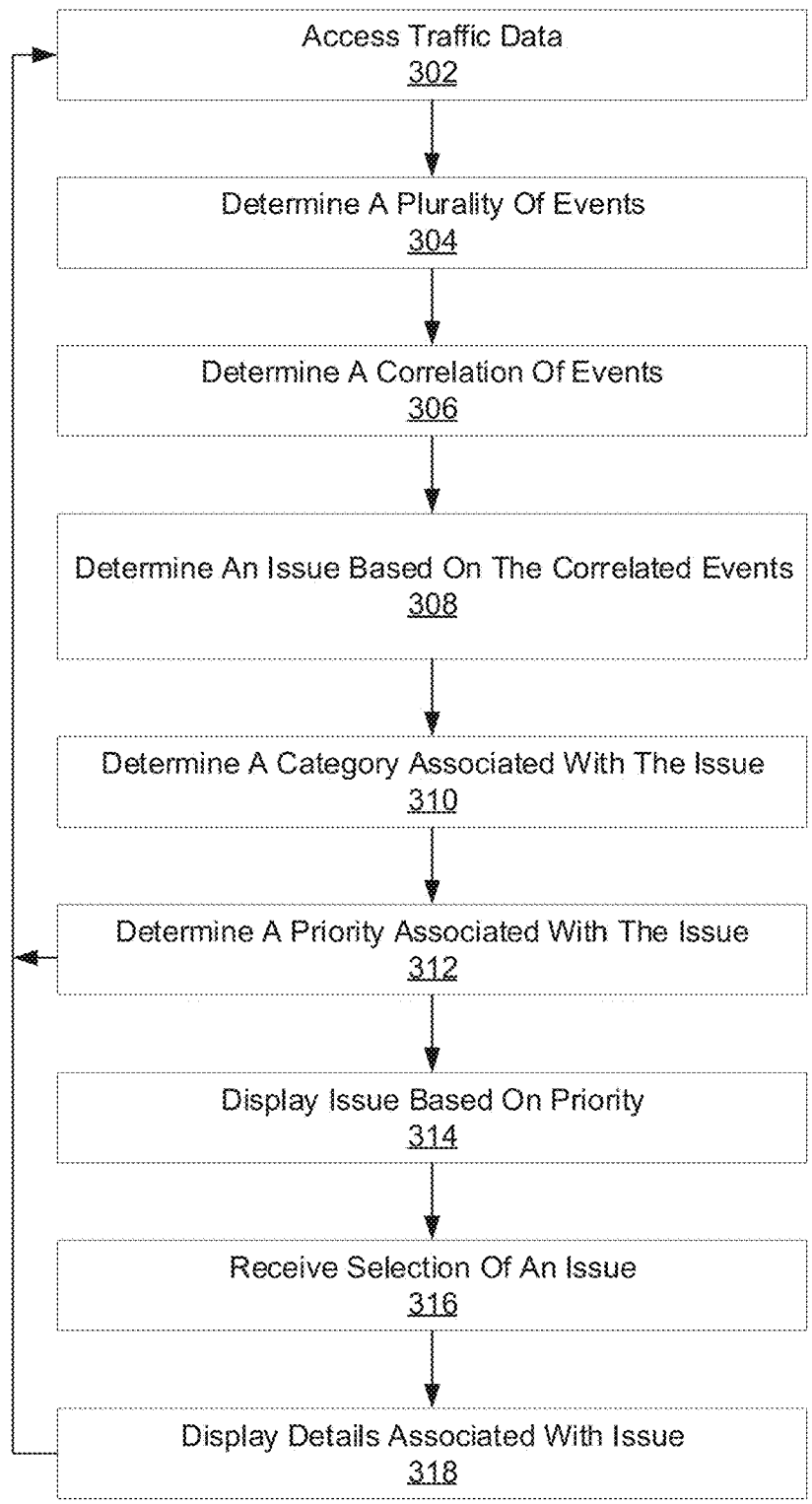
FIG. 3 depicts a flow diagram of aspects of a method for determining an issue based on one or more alerts, events, etc., in accordance with one implementation of the present disclosure.

With reference to FIG. 3, flowchart 300 illustrates example operations used by various embodiments. Although specific operation blocks ("blocks") are disclosed in flowchart 300, such blocks are examples. That is, embodiments are well suited to performing various other blocks or variations of the blocks recited in flowchart 300. It is appreciated that the blocks in flowchart 300 may be performed in an order different than presented, and that not all of the blocks in flowchart 300 may be performed.

FIG. 3 depicts a flow diagram of aspects of a method for determining an issue based on one or more alerts, events, etc., in accordance with one implementation of the present disclosure. Various portions of flowchart 300 may be performed by different components (e.g., components of system 1300) of an entity (e.g., network monitor device 102 or network monitor device 280). Flowchart 300 depicts a process for determining an issue based on correlating one or more alerts, events, vulnerabilities, etc., and (optionally) displaying details of the issue, as described herein. Flowchart 300 may be performed on a periodic basis, prompt (e.g., user prompted basis), a schedule, cloud service based schedule, or based on a policy.

At block 302, traffic data is accessed. The traffic may be accessed by a network monitoring entity (e.g., network monitoring devices 102 or 280-282) via a port mirroring or SPAN port. The traffic data may include one or more properties for each entity communicatively coupled to one or more networks. The traffic may include active scanning properties (e.g., if active scanning is enabled). The traffic may be used to classify entities of a network. The traffic may be used to determine various information, e.g., properties, associated with the entities of the network.

In some embodiments, entity related information may be accessed, from traffic or other sources, as described herein, including, but not limited to, vulnerability of entities, classification of entities, IP address information associated with entities, entity type information (e.g., controller, PLC, SCADA, server, IoT, etc.), network communication (e.g., the other entities an entity communicates with and the kind of communication exchanged), environment (e.g., branch office, factory, refinery, IT, etc.), vertical (e.g., business or industry), etc.

At block 304, a plurality of events is determined. The plurality of events may include alerts, entries in network logs, and entries in host change logs. The events, alerts, etc., may be determined based on intrusion detection functionality that is configured to match events to signatures, one or more databases, heuristics, and machine learning based on various factors. The events may be determined based on the data model, as described herein. In some embodiments, the events may be accessed from another system (e.g., an entity with intrusion detection functionality, for instance, system 150, an external system, SIEM, SOAR, etc.).

For example, a Stuxnet infection may be detected based on one or more events associated with remote procedure call (RPC) based peer to peer communication. Events can be determined based on deviations from communication baselines used to detect a Stuxnet infected entity searching for Siemens PLCs generating anomalous communication between two Windows XP™ machines. A Stuxnet infected entity may then attempt to connect to the Internet to update itself. This may be detected as an event based on a malware update being an anomalous communication with a public IP address. The compromise of a PLC may be detected as a dangerous operation to the PLC, e.g., download of a new firmware. This would allow Stuxnet to modify the logic of a targeted PLC. Stuxnet would then try to provide false feedback to the other controllers so they will not know the real state of process or compromised PLC until it is too late. Protocol behavioral inspection may be used to identify deviations within the OT process. With Stuxnet, the deceive and destroy process may detected based on anomalous communication patterns, e.g., writing of variable to a different registry, which may be each be determined to be events. Various events or alerts may be generated by detection of these actions or communications of entities infected with Stuxnet.

At block 306, a correlation of events is determined. The events may be correlated based on the data model, as described herein, thereby allowing correlation of events based on information about the network. In some embodiments, this may be based on clustering, event chains, and pattern matching. In various embodiments, events that are not correlated into an issue may counted, listed, displayed, etc., to allow for user analysis.

The clustering can include unsupervised machine learning methods that attempt to uncover the natural groupings and statistical distributions of the events. This can include grouping similar entities together to help profile the attributes of different groups. In other words, this may provide insight into underlying patterns of different groups of events. The grouping of a particular set of events based on their characteristics and aggregating them according to their similarities can reduce the event load on a user. The clustering of events allows aggregation of alerts with similar attributes to enable root cause discovery of an issue. This helps overcome the sheer number of alerts or events that make it difficult to review and respond each and every alert or event generated by an IDS. Clustering is thus a way for handling intrusion detection alarms or events more efficiently.

Features are defined as attributes extractable from raw network data, e.g., entity properties, entity details, etc., of which selection is crucial for network anomaly detection. Feature selection is the process of extracting specific features out of raw data to be loaded into an algorithm because not all algorithms may work with each kind of data. Feature selection offers a lot of advantages because it: improves the performance of an algorithm as it cuts down on feature dimensionality, removes insignificant features, and improves data quality and therefore the efficiency of learning algorithms, raises the detection rate, and helps in understanding the data generation process as well as visualizing it.

In some embodiments, the clustering includes accessing events (e.g., from an events database or repository), feature extraction and normalization, computing a similarity function, running a clustering algorithm, and evaluating results and adjusting. The feature extraction can include extracting alerts, information associated with entities (e.g., hosts), information from change logs, information from network change logs, links (e.g., information about the communication patterns of an entity, for instance, which entity starts a communication), etc. Links may be active communications channels between two entities. A link can be unidirectional or bidirectional. For example, if an engineering workstation (EWS) sends over a network a configuration file to a PLC then there is a unidirectional communication link from the EWS to the PLC. In some embodiments, the timestamp of events may be normalized to a range of zero to one. Event type identifiers may be mapped to an available taxonomy. Under an example taxonomy, event may be classified as being of the type security or operational. In turn, security event types can be further classified in common vulnerabilities and exposures (CVE) exploitation, known malware, weak password usage, anomalies in communication while operation event types can be further divided in network communication problems, misconfiguration or dangerous operations.

The computing of the similarity function can be the basis on which clustering is performed. This can include pairwise distance clustering for <Alerts[i], hosts[j]>, where i and j are individual features of events (e.g., alerts) and entities (e.g., hosts) respectively. The similarity function may be able to extend such that layer by layer further clustering is based on different features in a pairwise distance method. The running of the clustering algorithm creates clusters based on the similarity function. The clusters generated may be evaluated based on measuring the clustering efficiency and accuracy using the quantitative evaluation metrics, for instance, the sum of squared errors (SSE) of each cluster observations or qualitative evaluation with several experts (e.g., expert network engineers), or a combination thereof. After evaluation, the similarly function can be revised. The computation of the similarity function, running of the clustering algorithm, and evaluating of the results and adjustment can then be performed until the results are acceptable. After the similarity function is deemed acceptable it may be made available (e.g., via download or cloud resource) to one or more network monitoring entities (e.g., network monitoring device 102 or 280-282).

In some embodiments, the features used for extraction and normalization can include source IP address, destination IP address, protocol (e.g., protocol used when an event was generated), event destination port, time stamp, event type, service (e.g., combination of protocol and destination port), transmitted and received bytes (e.g., from the links between the monitored entities), severity (e.g., severity of an event in terms of how severe an impact the event can cause or how much the event needs attention), first seen time and last seen time of the connection associated with a host information (e.g., including a role of the entity, a vendor (e.g., manufacturer) associated with the entity, and a model (e.g., model number) associated with the entity).

In situations where there are similar types of events happening over and over again but separated by an interval, embodiments can perform clustering for each time interval can reveal how many issue clusters are there for same root cause. For example, for a DDoS attempt that happens two times a day, if the timestamp is not considered then the attacks will be considered as only one cluster, thus losing the attack granularity. By clustering based on timestamp, embodiments are able to perform clustering with attack granularity.

Embodiments can use the cross-feature of service (e.g., Layer 7 (L7) protocol and destination port) can ensure that the two entities are communicating together with same protocol mapped to a port number. For example, sometimes the protocol is unknown, but the port number can reveal the protocol itself and vice versa.

In some embodiments, the severity of alerts can be also used to prioritize the clusters themselves. For example, use of the maximum or average severity of the alerts and other events in a cluster can be used to determine the severity for the cluster.

In various embodiments, an entity feature may be used for clustering on source entity and destination entity based on Role (e.g., PLC, remote terminal unit (RTU), etc.). Vendor and Model information that is of the manufacturer of the entity and the model number of the entity can be used as attributes for similarity based clustering. For example, an entity may have attribute of a role of PLC, a vendor of Siemens, and a model S7-400.

The similarity functions may be based on timestamp, event type (e.g., event type identifier or event_type_id), service, entity or host, severity, or a combination thereof. In some embodiments, the similarity function for timestamp (e.g., timestamp based clustering) can be defined in two ways as shown in table II.

TABLE II example similarity functions for timestamps.

1. Psim = (t1 − t2) /tmax where t1 and t2 are the timestamps and tmax is the maximum timestamp observed used for normalization.
2. Given the timestamps t1 and t2 and Dt as granularity parameter (e.g. 1 Hour, 1 day, 1 minute), the similarity can be computed as:
   Fsim =
   {
                   1 if (t1 − t2) <
   Dt
       0 otherwise
   }

In some embodiments, the similarity function is based on comparing the roots of the event type (e.g., event_type_id) based on an event or alert taxonomy. For example, events in the Security side of the taxonomy are more similar among each other than events on the Operational side of the taxonomy. An example similarity function based on the event_type_id is shown in table III. For the other types of events, change logs can be considered part of an operational error taxonomy leaf A leaf is the inner or more specific part of a taxonomy tree. Network logs event types can be assigned to operational error (e.g., potentially dangerous operations and file read/write) or to the security/threats (e.g., DNS queries, authentication) leaves.

TABLE III example similarity function based on event type (event_type_id).

Fsim =
{
      1 . IP
    (event_type_id1==
event_type_id2)
        0.5 . IP
(event_type_id1 and
events_type_id2 is within the
same root of the taxonomy)
        0 . IP
(event_type_id1 and
events_type_id2 are from
different roots of the
taxonomy)
}

In various embodiments, a least common ancestor approach may be used to compute the similarity distance between two leaves of different sub-trees of events. For example, the similarity function may be defined as Fsim=Least_Common_Ancestor(event_type_id1, event_type_id2)/(height of the tree).

In some embodiments, the similarity function is based on the service feature which may include the protocol (e.g., Layer 7 protocol) and the destination port. An example similarity function based on the service feature is shown in table IV.

TABLE IV example similarity function based on the service feature.

Psim =
{
    1 IP proto1 == proto2
AND (proto1 != NotAKnownOne
and proto2 != NotAKnownOne)

TABLE IV-continued example similarity function based on the service feature.

AND dst_port1 == dst_port2
    0.5 IP (proto1 == Unknown
OR proto2 == NotAKnownOne)
AND dst_port1 == dst_port2,
    0 otherwise
}

In various embodiments, the similarity function is based on the feature of the entity or host. Distance measures between different cross-feature components can be defined as role: either equal (1) or different (0), vendor: normalized Edit distance, model: normalized Edit distance. Edit Distance is a commonly used technique of quantifying how dissimilar two strings (e.g., words) are to one another by counting the minimum number of operations required to transform one string into the other. The similarity function can be computed as: Fsim=SUM(Features distance)/Total # of Features. Table V shows example hosts and the similarity function is 2.5/3=0.83.

TABLE V example hosts features.

| Host | Role | Vendor | Model |
|---|---|---|---|
| SrcH1 | PLC | Siemens | S7400 |
| SrcH2 | PLC | Siemens | Sx230 |
| Distance | 1 | 1 | 0.5 |

In some embodiments, different weights can be assigned to the different features in order to make them more or less relevant in computing the similarity function.

In various embodiments, the similarly function may be based on severity. The severity may be normalized using a rank transformation. A simple Euclidean distance may be applied to compute similarity. Table VI shows example code for computing a similarity function based on severity, for two severity values s1, s2 and the maximum severity rank S=5.

TABLE VI example similarity function based on severity.

apply normalized rank transformation
s1_t = (s1 − 1) / (S − 1)
s2_t = (s2 − 1) / (S − 1)
compute the distance
Ds = Euclidean (s1_t, s2_t)
compute the similarity
Fsim = 1 − Ds A variety of algorithms can be used for clustering including, but not limited to, density-based spatial clustering of applications with noise (DBSCAN), K-medoids clustering or partitioning around medoids (PAM), hierarchical density-based spatial clustering of applications with noise (HDBSCAN). In some embodiments, multidimensional scaling (MDS) is used for visualizing the level of similarity of individual cases (e.g., events) of a data set. MDS may be used to translate information about the pairwise distances among a set of n objects or events into a configuration of n points mapped into an abstract Cartesian space. The two dimensional (2D) coordinates can be used to plot data on a scatter plot.

In some embodiments, an event chain includes an ordered collection of entities and an ordered collection of events (e.g., alerts) which link the entities. Event chaining associates or chains events together over time to build a sequence of events. The sequence of events may be treated as or determined to be an issue, as described herein.

Figure 12:
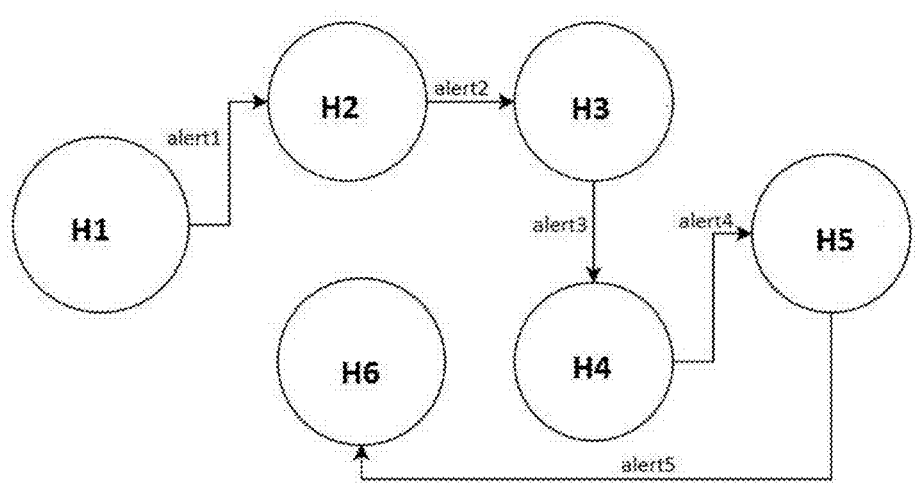
FIG. 12 depicts a diagram of an example event chain in accordance with one implementation of the present disclosure.

A graph of an example event chain based on the above is shown in FIG. 12. This procedure is substantially similar to finding a subset of the paths in a direct cyclic graph (DCG) generated by linking entities according to the alerts they generate. In some embodiments, the event chaining may be based on chaining events forward in time. The algorithm may work as follows:
- at the initial time, alert1 is generated with host H1 as source and host H2 as destination
- further in time host H2, destination of alert1, becomes the source of alert2 which in turn has host H3 as destination
- further in time host H3, destination of alert2, is the source of alert3 which in turn has host H4 as destination
- and so on and so forth up till a certain number of hops.

This procedure is substantially similar to finding a subset of the temporal walks in a direct cyclic graph (DCG) generated by linking entities according to the alerts they generate.

In some embodiments, a role of an entity may be associated with an event chain. The role of an entity can be based on what an entity is (e.g., an PLC) and what the entity does (e.g., controls a conveyor belt, a pump, a motor, etc.). The role of an entity may further be based on a device type associated with an entity, the applications or services running on the entity, etc.

In various embodiments, a role of an entity may have an associated criticality based on a Purdue Level associated with an entity. Chains may be prioritized based on entity criticality. For example, the Purdue Level mapping of an entity may provide insights as to how many chains the entity part of. In some embodiments, event correlation information, as described herein, may be included in a chain (e.g., a correlation among event types).

Embodiments can determine event chains based on forward chaining and backward chaining of events. The type of chaining can depend on the event (e.g., alert) timestamp ordering. A forward chain may be determined based on accessing events from a database, ordering the events by timestamps from past to present, and then applying an algorithm to determine the event chains. A backward chain may be determined based on accessing events from a database, ordering the events by timestamps from present to past, and then applying an algorithm to determine the event chains. For example, backward chaining may be useful for chaining the events from recent event to the last event, for instance, to analyze potentially dangerous operations (e.g., PLC reconfiguration) from the start (e.g., first event in time of the attack). The last stage of an attack may be determined to be an event with high severity and the associated chain can be assigned a high severity based on event of the last stage having high severity, which can allow a user (e.g., analyst) to focus in on the attack based on the severity of the event chain.

In some embodiments, a type of security or operational (e.g., category) may be assigned to a chain based on the events of the chain. A chain may be displayed or listed with the first and last seen timestamps. In various embodiments, duplicate chains may be merged (e.g., before a new chain is created). In some embodiments, attributes of duplicate data may be consolidated and unified in a single attribute in an event chain object (e.g., in an events list).

A network edge in the graph or hop can be used as a measure unit for the length of an event chain. A hop within an event chain allows a jump from one entity (e.g., source) to another entity (e.g., destination) though an event (e.g., alert). Embodiments can use a minimum number of hops to determine whether a set of events constitutes a chain. For example, a minimum of two hops may be the minimum number of hops for an event chain. In some embodiments, a maximum number of hops of a chain to consider may be a user configurable option (e.g., to allow faster and less resource intensive event chain determination).

In some embodiments, an algorithm for determining an event chain can incorporate attributes including event type, timestamp at which the events or alerts were raised, severity of alerts, source IP address and destination IP address in order to correlate them to determine the chained events (e.g., issues). In various embodiments, one or more attributes may be selected and chains determined based on matching the one or more attributes. For example, a user may select an event type and chains can be determined and displayed based on having an event matching the selected event type.

In some embodiments, events may be pre-processed before applying an algorithm to determine an event chain. The pre-processing can include filtering events by ordering them by timestamp and entities with no role being mapped to an "unknown" role. The pre-processing may include filtering an event if the event is already in a chain, so that the event it is not considered for building or determining other chains. This can limit the number of paths to be discovered in the graph and may considerably reduce the complexity of the algorithm. The number of hops may be limited from two to ten since very long chains often may include cycles on the same entities and events over and over again. In some embodiments, chains may be determined and stopped before a cycle of events between entities is part of the chain. Chains may be ordered by severity, e.g., the maximum severity of the chained alerts can be assigned the severity to chain itself. The filtering of alerts and chains may bring the complexity down from exponential to $O(n^2)$.

In various embodiments, the event chain determination algorithm may take into account the time span between two events in a chain. For example, a threshold may be configured to filter out events that are separated in time by more than one day or 12 hours.

Embodiments may use pattern matching to bundle together events as part of a pattern or situation so that the number of events is greatly reduced. The use of pattern matching can help a user in the event selection phase by reducing the amount of data to be analyzed to find issues and select issues to focus on. For example, the benefits of pattern matching include it allows to embedding OT-specific knowledge of industrial protocols by building patterns that leverage it, it allows correlation of alerts with change logs, network logs, and information which is currently separated, and it is relatively easy to implement by using simple regular expression (regex) methods and performance can be optimized by choosing an appropriate time window on the event stream. Embodiments may support future enhancement by downloading or accessing new patterns as additional pattern matching content material becomes available. Embodiments can also support matching of custom patterns (e.g., user defined patterns).

In some embodiments, a pattern matching engine may be able to aggregate multiple patterns into a single pattern while other patterns are kept separate. The pattern matching engine may have features including automatic generation of a case or issue for a recurrent pattern, pattern expressiveness (e.g., using some more expressive language than regular expressions), be able to assign a score to the pattern in order to improve prioritization, automatically aggregate patterns that happen multiple times, or combine multiple patterns into a single "story" (e.g., an higher level of abstraction). The assigning of a score to a pattern can be complemented by a confidence/matching heuristics depending on how many events in the pattern are matched.

Embodiments may support matching a variety of patterns including, but not limited to, custom defined patterns (e.g., user defined patterns), a new host (e.g., based on alerts and changes logs generated when a new entity or host appears, this may be a generic pattern), a new communication (e.g., collection of alerts and change logs generated when a new communication type appears in a network, this may be a generic pattern), a new dangerous host (e.g., new host events followed by a potentially dangerous operation initiated by the same host or of which the host is a destination, this may be a generic pattern), a controller reconfiguration (e.g., events related to a reconfiguration of a controller, dangerous controller reconfiguration (e.g., a reconfiguration pattern followed by another potentially dangerous operations from the same host), an entity malfunctioning (e.g., events related an entity malfunctioning which can be spotted through the network, this may be specific for each protocol, but with some general alerts which can be added to it), a malfunctioning controller (e.g., reconfiguration and network malfunctioning patterns merged together), a potentially dangerous login (e.g., events of login attempt, login successful, new protocol or link, and high severity alert), or a potential successful reconnaissance (e.g., port scanning alert with login attempt or login success, or potentially dangerous operations (PDOP), for instance, operations associated with industrial controllers which might harm the operational continuity of the system).

In some embodiments, the controller reconfiguration pattern is matched based on collecting events which have the same host as source or destination. The controller reconfiguration pattern may represent a collection of patterns with each pattern being specific for each protocol with more or less events to be taken into account.

Embodiments may support pattern matching for frequency-related patterns including, but not limited to, a pattern for repeated event types (e.g., based on identifying large amount of repetitions of some events with some parameters), a pattern for low-frequency event types, a pattern for events which stop happening, and hosts which disappear from the network. Embodiments may support pattern matching for complex multi-event patterns including, but not limited, killchain matching and MITRE ATT&CK.

In some embodiments, the pattern matching algorithm looks for specific user-defined patterns in the list of events. The patterns can be distinguished into two main categories: simple patterns and complex patterns. The simple patterns can be patterns based on a limited number of different events (e.g., reconfiguration pattern or new host pattern). The complex patterns can be patterns based on categories of events (e.g. the cyber kill-chain and the ATT&CK TTP Pattern). These patterns can involve matching wildcards for event type names and the matching can occur with a large number of event type IDs.

In various embodiments, the pattern matching algorithm workflow may include accessing an input pattern file (e.g., in JavaScript object notation (JSON) format), selecting events in a sliding window (e.g., defined in the input pattern file), selecting events which are part of the input pattern file, encoding an event sequence in a string, running one or more chosen pattern matching algorithms, and extracting and visualizing the recognized patterns. Selection of events in the sliding window may then be repeated for the next time window. The selecting of the sliding window may include selecting only the events belonging to the current time window. Within the time window, selection may be of only the events which are part of the pattern based on the input pattern file. The building of the event string may include encoding the event sequence in a string with each character encoding a particular event type in the pattern. The string encoding may be done in a simple way, e.g., event_type_id_1 encoded as "a" and event_type_id_2 encoded as "b." In some embodiments, the string encoding further includes source host and destination host identifiers.

The running of the pattern matching algorithm may include finding the patterns in the event string by compiling a regular expression. The one or more patterns determined may be mapped with the actual events and stored for later visualization. The granularity of the time sliding window can be selected from the input file provided. The pattern of the input pattern file may be defined explicitly, with regular expressions, etc.

In some embodiments, the correlation of events may be based on grouping events based data associated with the events including common features or commonalities and specific information of networks. The grouping or correlations maybe based on different rules and algorithms including automatic (e.g., performed without human involvement) algorithms. The correlations can be based on common hosts or entities, industrial protocols, IoCs, vulnerabilities, and other information extracted from the network. Events may be correlated or aggregated to an issue based on event type, source, destination, and protocol.

Embodiments may support selection of different algorithms to be used for correlating events. In some embodiments, the selection of algorithms used for correlation may be based on the environment, vertical, etc. The algorithms may be selected by a user or automatically based on information associated with a network or the data model.

In various embodiments, new algorithms may be made available for download or as an update. The algorithms may be developed specifically to detect new threats and correlate events in such a way so as to quickly identify if a high threat issue is present on a network. There can thus be differentiation based on vertical, redistribution, refinery, manufacturing, threats, etc. For example, the algorithms can be configured to detect new malware or other threats (e.g., industrial malware), different ways of PLCs functioning, etc.

Embodiments support customization of the correlation criteria. For example, correlation criteria could be based on certain types of attacks that are known to occur in the network, e.g., electrical infrastructure, refinery industries, other verticals, etc. As another example, a user may have a specific need for blocking some kinds of communication and an algorithm can be configured to detect if such communications are happening (e.g., despite efforts to block communications). It is appreciated that the algorithms are flexible in nature and can be customized before and after deployment.

At block 308, an issue is determined based on the correlation of events. An issue is determined based correlation of multiple events. An issue can further be determined based on a correlation of one or more events, alerts, along with context, risk posture, or vulnerabilities, as described herein. Embodiments allow configuration, customization, or a combination thereof of correlation criteria used for correlation of events and other information into issues, as described herein.

At block 310, a category associated with the issue is determined. The category associated with an issue can include security (e.g., malware), operational (e.g., reconfiguration of a controller, malfunction, etc.), attack type or similar attack (e.g., Mirai like attack), etc., as described herein.

The category can be useful for forwarding an issue to a relevant person or department within an enterprise. For example, an IT analyst can forward operational issues to operation engineers (e.g., OT engineers) in a plant. Embodiments are thus able to leverage knowledge of the networks (e.g., OT network knowledge) to enable forwarding of issues that are potentially dangerous and for operational continuation. As another example, issues that are categorized as security can be dealt with by an IT analyst directly.

At block 312, a priority associated with the issue is determined. The priority may be critical, high, medium, low, or informational. The priority may be based on criticality of an entity, risk, the severity associated with an issue or an event associated with the issue, etc., as described herein.

At block 314, the issue is displayed based on priority. The issue may be displayed in a list of issues and the list may be sorted by priority (e.g., FIG. 7) with various associated details.

At block 316, a selection of the issue is received. A user may select an issue to view more details and the associated events at various points in time associated with the issue (e.g., as shown in FIGS. 4-6 and 8-11), as described herein.

At block 318, details associated with the issue are displayed. In some embodiments, various details associated with the issue are displayed over multiple points in time. The multiple points in time may be determined based on time stamps associated with events associated with the issue. The set of points in time can be used to show various stages of an issue (e.g., an attack or a malfunction in an industrial controller). For example, an initial stage may include the first event of an attack, e.g., communication with an insecure protocol, a second stage may show spreading of an attack, and a third stage may include one or more compromised entities communicating with the Internet or another network (e.g., a network of another company location, for instance, another plant or factory) and one or more possible identifications of the attack. The display of an issue over various periods of time allows the evolution of an issue to be viewed over time.

In some embodiments, the various points in time may be navigated by use of a slider GUI element (e.g., as shown in FIGS. 8-11). The associated network graph of relevant portions of the network are displayed with each point in time (e.g., FIGS. 4-6 and 8-11). The points in time may be displayed at different tabs for a GUI with details associated with each point in time (e.g., FIG. 4-6). The issue may also be displayed with other information including host information, risk posture, for instance including vulnerabilities, etc.). Connection with other contextualized elements (e.g., host and risk posture, for instance vulnerabilities) can be displayed as well.

Block 302 may then be performed, e.g., on a periodic basis, prompt (e.g., user prompted basis), a schedule, cloud service based schedule, or based on a policy. For example, a policy may be created for correlating events based conditions including traffic volume being above a threshold, a number of new entities being detected, or other events described herein. The policy can automatically invoke process 300 in response to one or more of the conditions of the policy being met.

While example user interfaces 400-1200 of FIGS. 4-12 may be described with respect to entities, hosts, or devices, embodiments support other entities (e.g., users, services, etc.). User interfaces 400-1200 may be rendered or displayed by an entity or device (e.g., network monitor device 102 or network monitor devices 280-282). The example user interfaces 400-1200 may be command line interfaces, graphical user interfaces, etc. The example user interfaces 400-1200 may be part of a dashboard, webpage, and be based on cloud collected information (e.g., from one or more networks) and based on information from one or more network monitoring devices (e.g., network monitor device 102 or 280-282).

Figure 4:
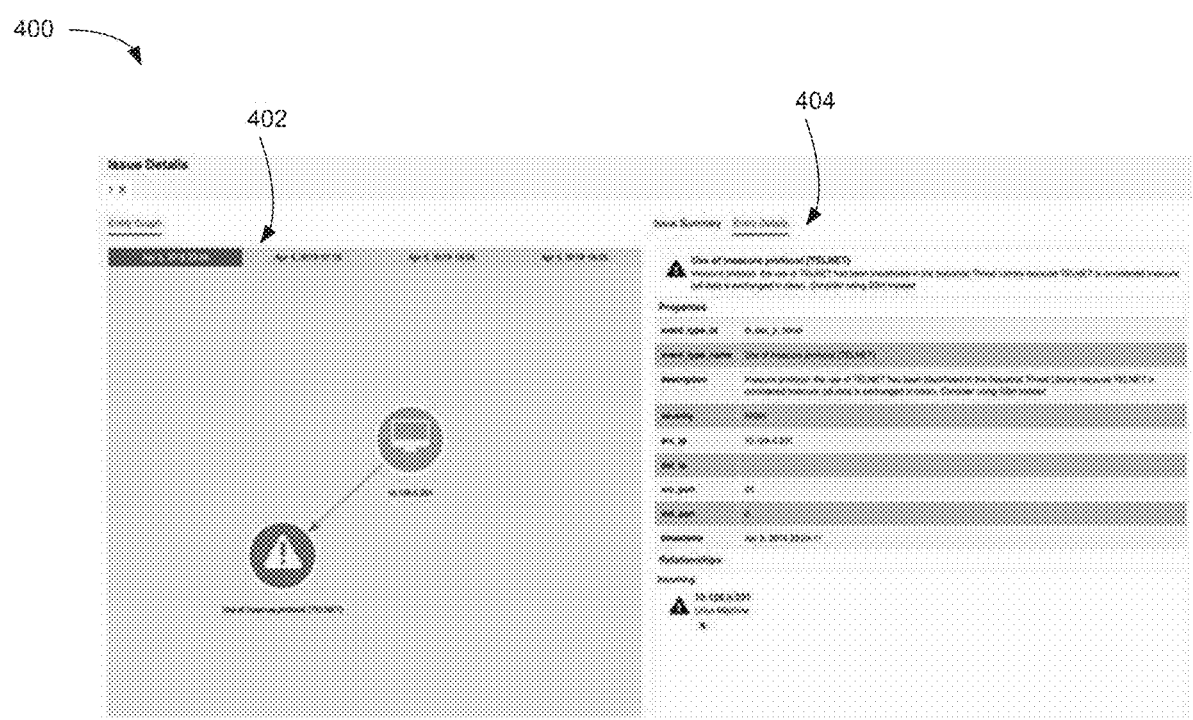
FIG. 4 depicts aspects of an example graphical user interface (GUI) for viewing issue details including the first event associated with the issue in accordance with one implementation of the present disclosure.
Figure 5:
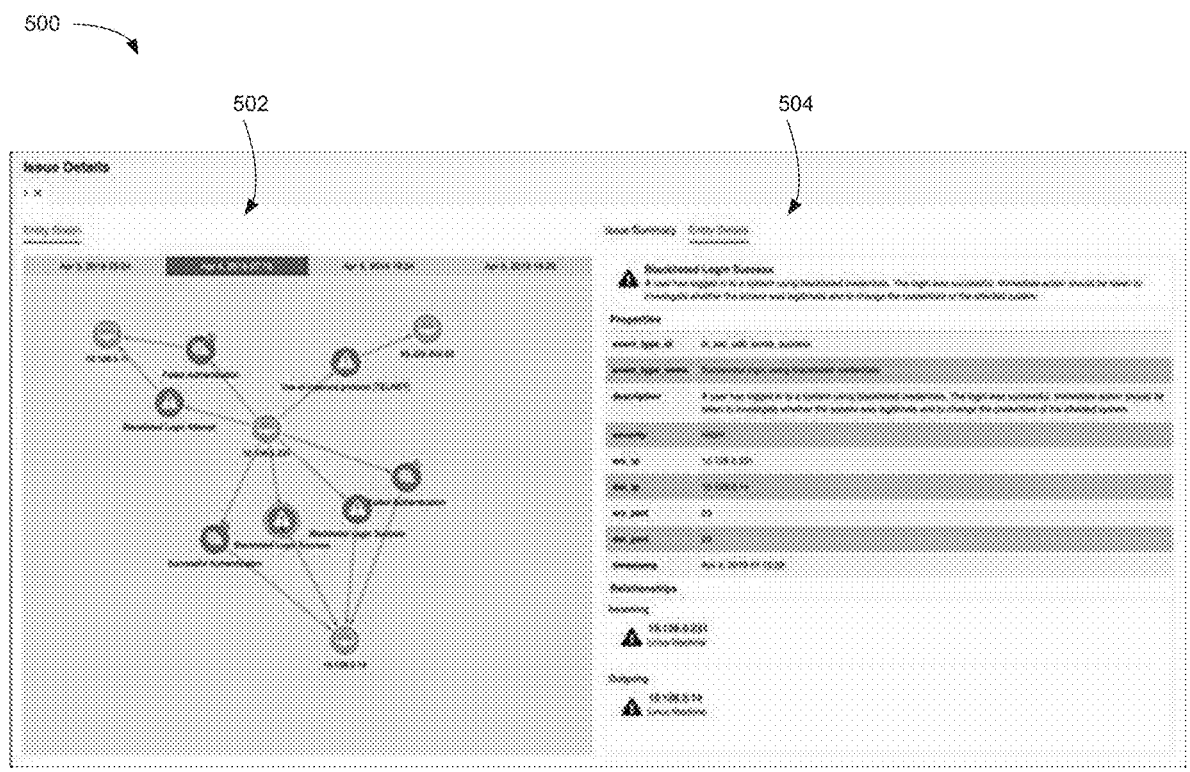
FIG. 5 depicts aspects of an example graphical user interface for viewing issue details including a plurality of events at another point in time associated with the issue in accordance with one implementation of the present disclosure.
Figure 6:
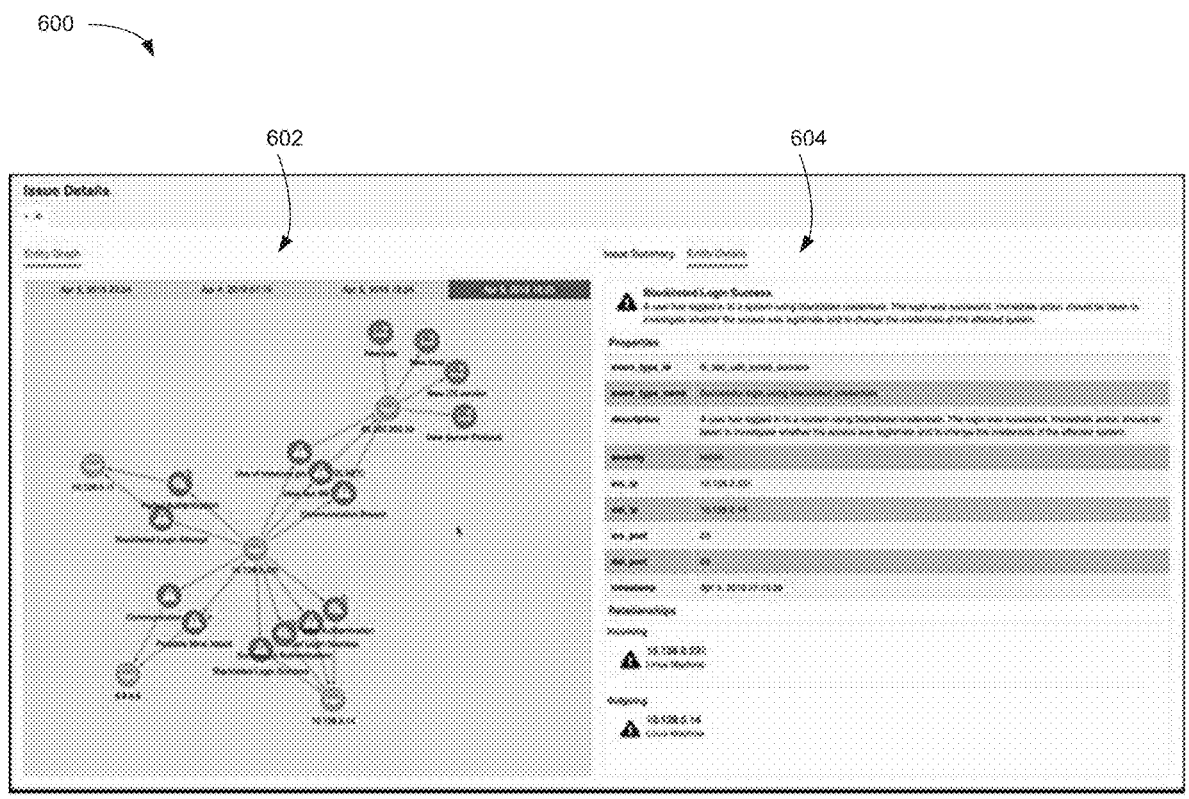
FIG. 6 depicts aspects of an example graphical user interface for viewing issue details including another plurality of events at another point in time associated with the issue in accordance with one implementation of the present disclosure.

FIG. 4 depicts aspects of an example graphical user interface for viewing issue details including the first event associated with the issue in accordance with one implementation of the present disclosure. FIGS. 4-6 are related to a botnet attack, for instance, Mirai attack. FIG. 4 depicts an example GUI 400 with the graph area 402 and details area 404. Graph area 402 includes timestamps related to an issue (e.g., an issue selected by a user for investigation) and graphs showing the entities and events associated with the timestamp. Details areas 404 includes tabs for an issue summary and entity details. The entities details tab, as shown in example GUI 400 shows various event and entity details, e.g., the details of a selected event or alert (e.g., blacklisted login success).

Details area 404 depicts an alert associated with an entity, based on the entity using an insecure protocol (e.g., TELNET) at a first instance in time. The alert is associated with the host 10.128.0.231. The timeline shows that the event occurred as the first event in time associated with the issue. The timeline includes that start and end timestamps of the issue which are shown in the graph. FIG. 4 shows that at the beginning of the time range, there is one alert associated with an entity, e.g., that the entity with IP address 10.128.0.231 used the Telnet protocol.

FIG. 5 depicts aspects of an example graphical user interface for viewing issue details including a plurality of events at another point in time associated with the issue in accordance with one implementation of the present disclosure. FIG. 5 depicts an example GUI 500 including more details related to the issue of FIG. 4, including showing the spreading of an attack (e.g., Mirai) across a network at a second point in time. FIG. 5 depicts an example GUI 500 with the graph area 502 and details area 504. FIG. 5 includes graph area 502 which is substantially similar to graph area 402 and details area 504 which is substantially similar to details area 404. FIG. 5 further depicts the details of a "Blacklisted Login Success" alert as well as various blacklisted login attempts, failed authentications, and successful authentications.

Example GUI 500 shows that the issue has evolved and how the problem is spreading in the network. This is shown as from the additional alerts that are departing from or are beyond the first use of Telnet in graph area 502.

In some embodiments, the timestamps may be associated with multiple events. That is a timestamp selected via example GUI 500 can show multiple events. The various events shown in example GUI 500 are events related to logins or authentication including failed authentications, blacklisted login attempts, successful authentications, and blacklisted login successes. The successful authentications may be part of the entity 10.128.0.231 controlling entity 10.120.0.14. The failed authentications may be part of events of entity 10.128.0.231 trying to take control of entity 10.128.0.11 and failing to do so.

Example GUI 500 is able to show that the issue is evolving from the use of the insecure protocol (e.g., Telnet) to attempting to authenticate with multiple entities and successfully authenticating with an entity (e.g., likely before taking control of it). Embodiments may be based on the timestamps based on the data model of the network. For example, an entity using Telnet prior to attempting to authenticate or login into other devices may be used to group events (e.g., as shown in FIGS. 4 and 5) of an issue for display.

FIG. 6 depicts aspects of an example graphical user interface for viewing issue details including another plurality of events at another point in time associated with the issue in accordance with one implementation of the present disclosure. FIG. 6 depicts an example GUI 600 with the graph area 602 and details area 604. FIG. 6 includes graph area 602 which is substantially similar to graph area 502 and details area 604 which is substantially similar to details area 504.

FIG. 6 depicts more alerts and other events associated with the attack at a later point in time. This includes, for instance, communication with public IP addresses, new hosts, new operating system versions, new server protocols, etc., due to the communications of the both with the command and control server, as is common with the Mirai attack, as shown in graph area 602. Example GUI 600 shows the issue with each of the events associated with the issues.

Graph area 602 allow a user to see each of the events related to an issue and investigate in detail events associated an issue. For example, if a user wants to investigate events related to entity with IP address 65.222.202.53 to see if there are vulnerabilities related to the IP address. Example GUI 600 shows that the entity with IP address 65.222.202.53 has a new role event, new host event, new OS version event, and new server protocol event.

Embodiments thus allow a user to be able to get to the root cause of an issue because of the ability to view the issue at various points in time including the one or more initial events associated with an issue. Embodiments may generate an event or alert that an attack is going on and optionally that it is a possible Mirai attack.

Details area 604 shows the details of the blacklisted login success that has been selected. The relationships portion of details area 604 includes details of the ingoing and outgoing communications and the operating system of the entities sending the ingoing and outgoing communications.

Figure 7:
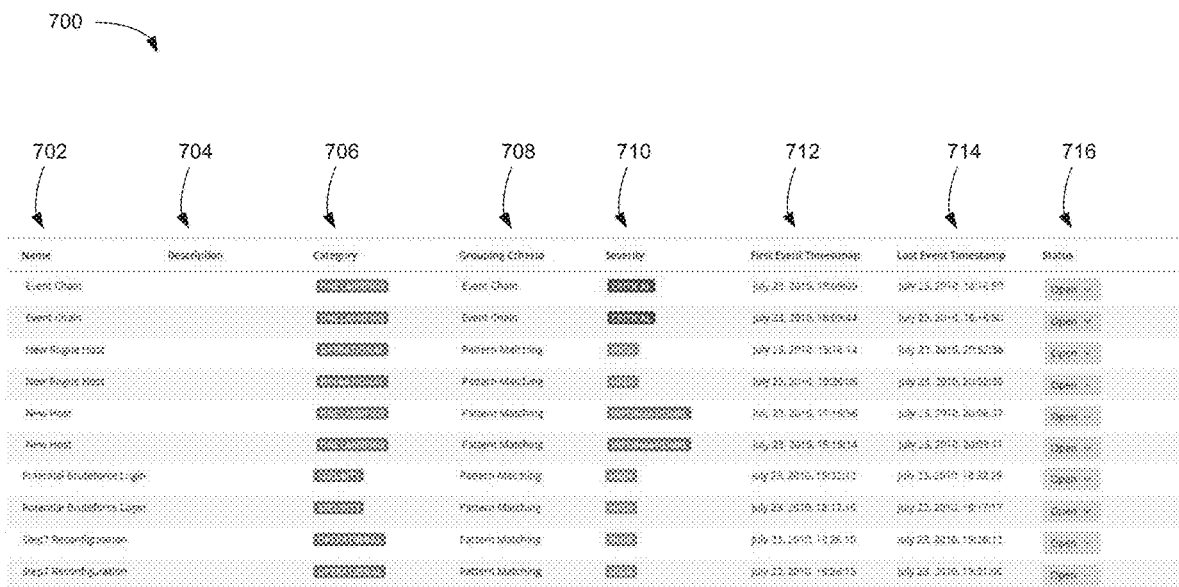
FIG. 7 depicts aspects of an example graphical user interface portion for displaying a list of issues in accordance with one implementation of the present disclosure.

FIG. 7 depicts aspects of an example graphical user interface portion for displaying a list of issues in accordance with one implementation of the present disclosure. FIG. 7 depicts an example listing of a plurality of issues and associated details. FIG. 7 allows a user (e.g., analyst) to review and select issues (e.g., to view more details via example GUIs shown in FIGS. 4-6 and 8-11). This allows the user to avoid a flood of events and have to review and determine issues from a large number of events.

Example GUI 700 includes columns 702-716. Column 702 includes the name of the issue, which may include the type of issue determined (e.g., new rogue host, Step 7 reconfiguration). Column 704 includes a description of the issue, where available. Column 706 includes a category of the issue (e.g., security, operational, unclassified, etc.). Column 708 includes the group criteria or how the issue was determined (e.g., event chain, pattern matching, clustering, etc.). Column 710 includes the severity of the issue (e.g., critical, high, informational, etc.). Column 712 includes the first event timestamp associated with an issue. etc.). Column 714 includes the last event timestamp associated with an issue. Column 716 includes status identifiers for each issue (e.g., Open or Closed) and allows a user to change the status of an issue.

Figure 8:
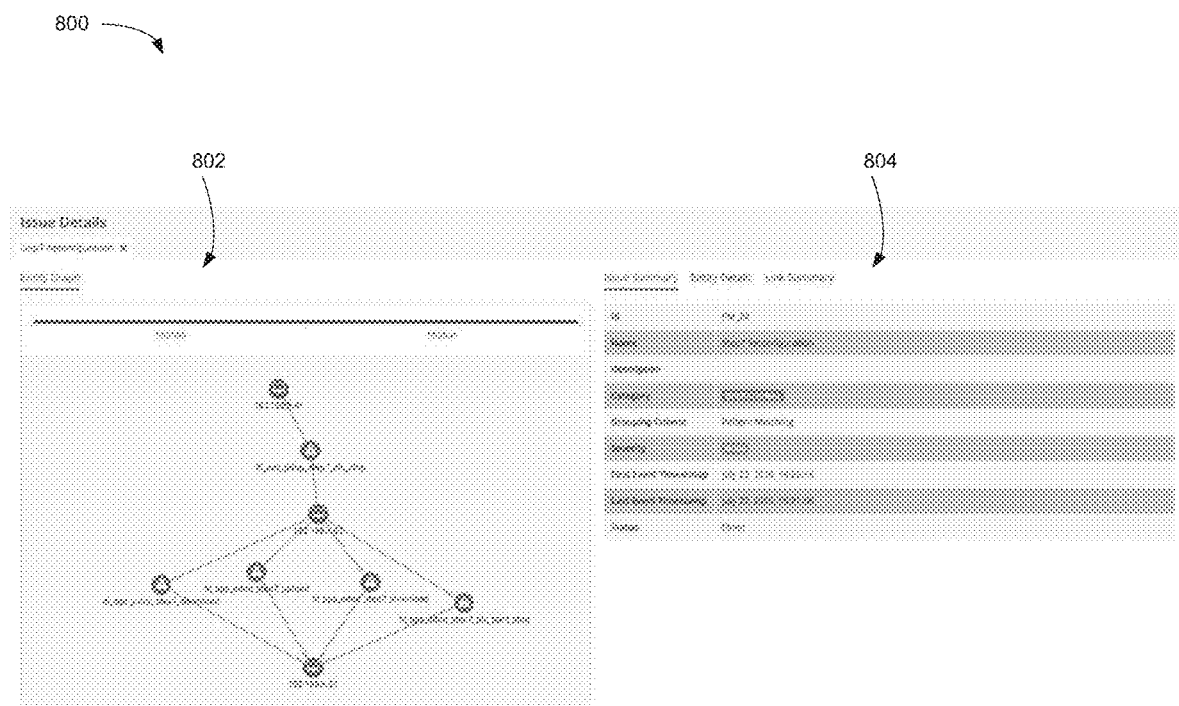
FIG. 8 depicts aspects of an example graphical user interface for viewing an issue summary associated with the issue in accordance with one implementation of the present disclosure.

FIG. 8 depicts aspects of an example graphical user interface for viewing an issue summary associated with the issue in accordance with one implementation of the present disclosure. FIG. 8-11 are related to a reconfiguration issue. FIG. 8 depicts an example GUI 800 with the graph area 802 and details area 804. Graph area 802 includes a slider for navigating timestamps related to an issue (e.g., an issue selected by a user for investigation via example GUI 700) and graphs showing the entities and events associated with the timestamp. Details areas 804 includes tabs for an issue summary and entity details. Details area 804 shows the issue summary selected and shows various details related to the issue (e.g., including the details show in FIG. 7).

Figure 9:
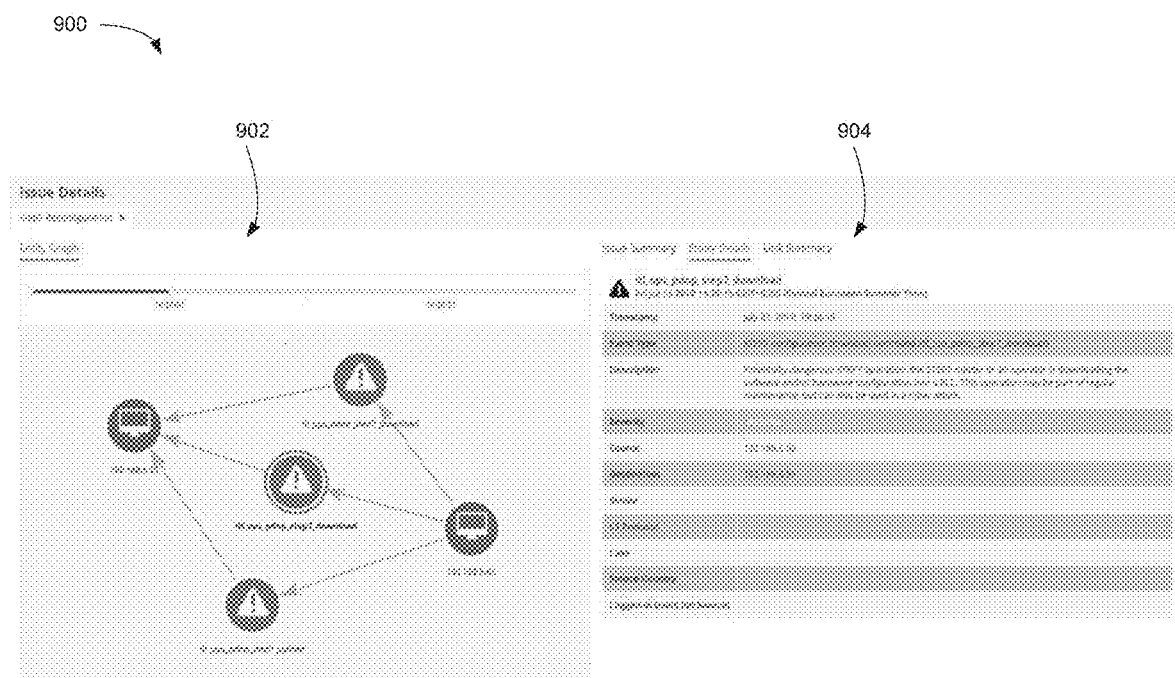
FIG. 9 depicts aspects of an example graphical user interface for viewing issue details of a potentially dangerous issue in accordance with one implementation of the present disclosure.

FIG. 9 depicts aspects of an example graphical user interface for viewing issue details of a potentially dangerous issue in accordance with one implementation of the present disclosure. FIG. 9 depicts an example GUI 900 including details related to the issue of FIG. 8, including showing the initial events of the reconfiguration a first point in time. FIG. 9 depicts an example GUI 900 with the graph area 902 and details area 904. FIG. 9 includes graph area 902 which is substantially similar to graph area 802 and details area 904 which is substantially similar to details area 804. FIG. 9 further depicts the details of a STEP7 configuration download command event.

Figure 10:
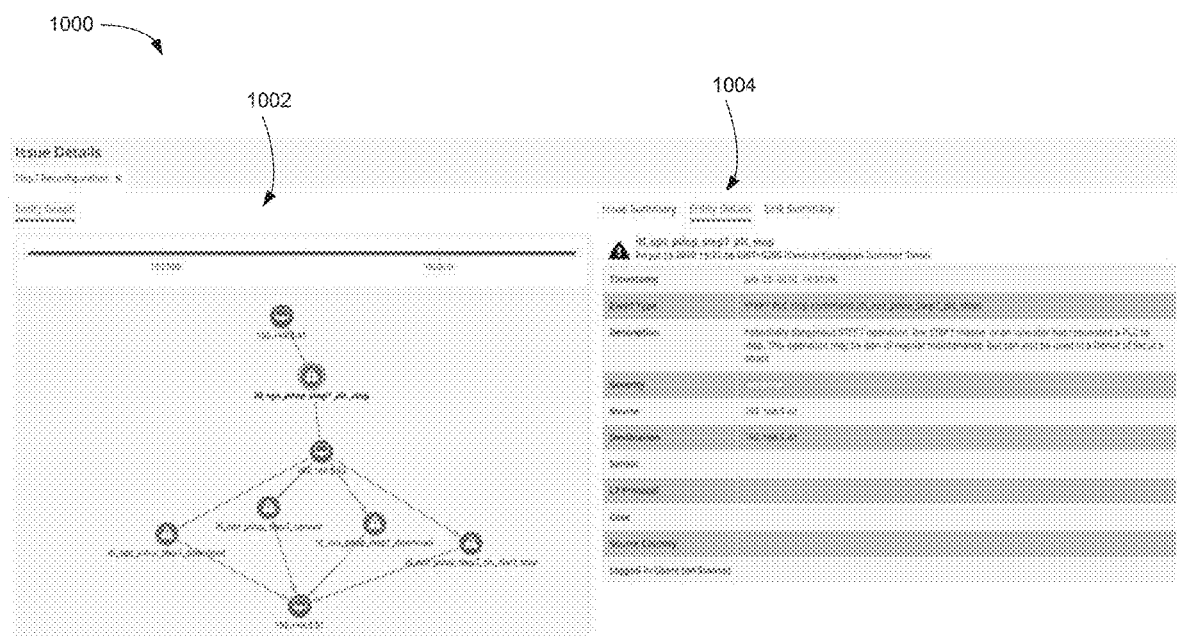
FIG. 10 depicts aspects of an example graphical user interface for viewing issue details of a potentially dangerous issue at another point in time in accordance with one implementation of the present disclosure.

FIG. 10 depicts aspects of an example graphical user interface for viewing issue details of a potentially dangerous issue at another point in time in accordance with one implementation of the present disclosure. FIG. 10 depicts an example GUI 1000 including details related to the issue of FIG. 8, including showing the further events of the reconfiguration at another point in time. FIG. 10 depicts an example GUI 1000 with the graph area 1002 and details area 1004. FIG. 10 includes graph area 1002 which is substantially similar to graph area 902 and details area 1004 which is substantially similar to details area 904. FIG. 10 further depicts the details of a STEP7 PLC stop command event.

Figure 11:
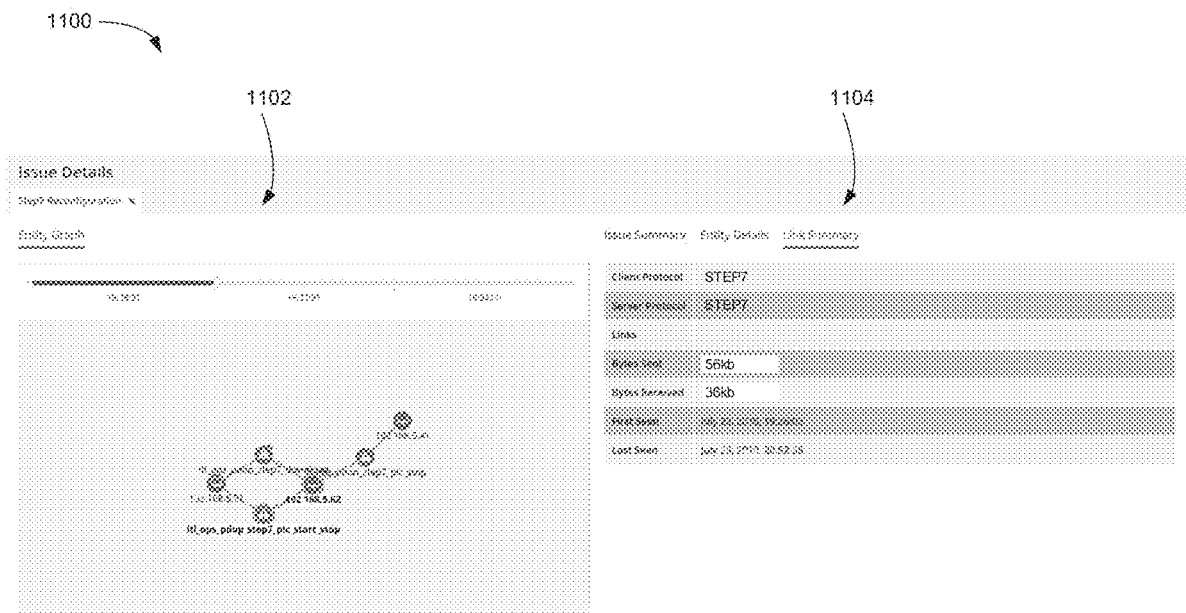
FIG. 11 depicts aspects of an example graphical user interface for viewing a link summary associated with an issue in accordance with one implementation of the present disclosure.

FIG. 11 depicts aspects of an example graphical user interface for viewing a link summary associated with an issue in accordance with one implementation of the present disclosure. FIG. 11 depicts an example GUI 1100 including details related to the issue of FIG. 8, including showing a link summary of the communications details (e.g., the protocols of the client and server, the bytes sent and received, etc.). FIG. 11 depicts an example GUI 1100 with the graph area 1102 and details area 1104. FIG. 11 includes graph area 1102 which is substantially similar to graph area 1002 and details area 1104 which is substantially similar to details area 1004.

FIG. 12 depicts a diagram of an example event chain in accordance with one implementation of the present disclosure. Example event chain 1200 includes entities or hosts H1-H6 and associated events or alerts1-5. Example event chain 1200 depicts an event chain determined by embodiment, e.g., by correlating alerts1-5. The alerts may be correlated based on the event chain algorithms as described herein. For example, alert1 is associated with hosts H1 and H2, alert2 is associated with hosts H2 and H3. Alert3 is associated with hosts H3 and H4. Alert4 is associated with alerts H4 and H5. Alert6 is associated with alerts H5 and H6.

Figure 13:
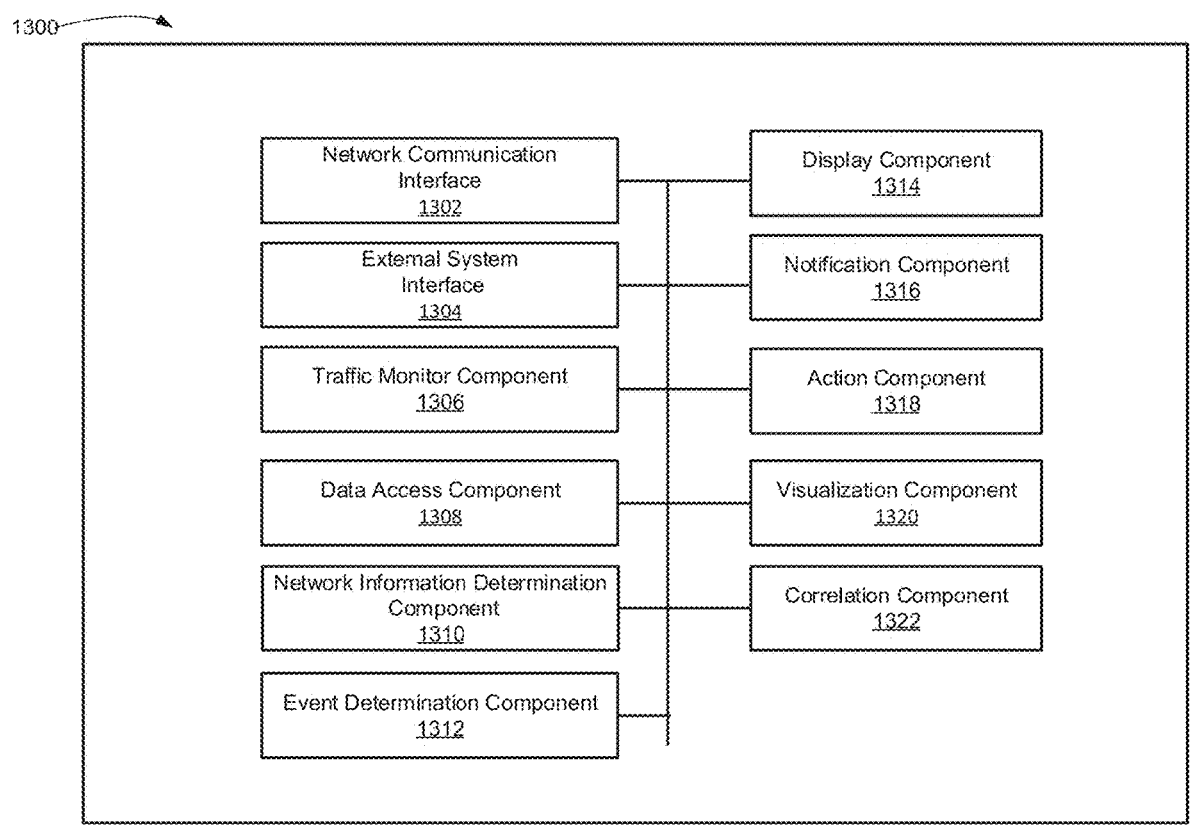
FIG. 13 depicts illustrative components of a system for determining one or more issues based on a plurality of events in accordance with one implementation of the present disclosure.

FIG. 13 illustrates example components used by various embodiments. Although specific components are disclosed in system 1300, it should be appreciated that such components are examples. That is, embodiments are well suited to having various other components or variations of the components recited in system 1300. It is appreciated that the components in system 1300 may operate with other components than those presented, and that not all of the components of system 1300 may be required to achieve the goals of system 1300.

FIG. 13 depicts illustrative components of a system for determining one or more issues based on a plurality of events in accordance with one implementation of the present disclosure. Example system 1300 or event analyzer 1300 includes a network communication interface 1302, an external system interface 1304, a traffic monitor component 1306, a network information determination component 1308, an event determination component 1310, a correlation component 1312, a display component 1314, a notification component 1316, an action component 1318, and a visualization component 1320. The components of system 1300 may be part of a computing system or other electronic device (e.g., network monitor device 102 or network monitor devices 280-282) or a virtual machine or device and be operable to monitor one or more entities communicatively coupled to a network, monitor network traffic, and classify the one or more entities, determine one or more issues, as described herein. For example, the system 1300 may further include a memory and a processing device, operatively coupled to the memory, which may perform the operations of or execute the components of system 1300. The components of system 1300 may access various data and characteristics or properties associated with an entity (e.g., network communication information or traffic), data associated with one or more entities (e.g., from network devices, local resources, cloud resources, external systems, for instance system 150), etc., as described herein. It is appreciated that the modular nature of system 1300 may allow the components to be independent and allow flexibility to enable or disable individual components or to extend, upgrade, or combination thereof components without affecting other components thereby providing scalability and extensibility. System 1300 may perform one or more blocks of flow diagram 300.

Communication interface 1302 is operable to communicate with one or more entities (e.g., network device 104, firewalls 202-206, switches 210-220, other devices coupled thereto, devices 230-262, etc.) coupled to a network that are coupled to system 1300 and receive or access information about entities (e.g., device information, device communications, device characteristics, properties, etc.), access information as part of a passive scan, send one or more requests as part of an active scan, receive active scan results or responses (e.g., responses to requests), access events determined by another system, as described herein. The communication interface 1302 may be operable to work with one or more components to initiate access to characteristics or determination of characteristics of an entity to allow determination of one or more properties which may then be used for device compliance, asset management, standards compliance, classification, identification, etc., as described herein. Communication interface 1302 may be used to receive and store network traffic for determining properties, as described herein.

External system interface 1304 is operable to communicate with one or more third party, remote, or external systems to access information including characteristics or attributes associated with an entity, events, etc. External system interface 1304 may further store the accessed information in a data store. For example, external system interface 1304 may access information from a vulnerability assessment (VA) system to enable determination of one or more compliance or risk characteristics associated with the entity. External system interface 1304 may be operable to communicate with a vulnerability assessment (VA) system, an advanced threat detection (ATD) system, a mobile device management (MDM) system, a firewall (FW) system, a switch system, an access point (AP) system, etc. External system interface 1304 may query a third party system using an API or CLI. For example, external system interface 1304 may query a firewall or a switch for information (e.g., network session information) about an entity or for a list of entities (e.g., an ARP table) that are communicatively coupled to the firewall or switch and communications associated therewith. In some embodiments, external system interface 1304 may query a switch, a firewall, or other system for information of communications or properties associated with an entity.

Traffic monitor component 1306 is operable to monitor network traffic to determine if a new entity has joined the network or an entity has rejoined the network and monitor traffic for analysis by a network information determination component 1308, an event determination component 1310, a correlation component 1312, a visualization component 1320, among others, as described herein. Traffic monitor component 1306 may have a packet engine operable to access packets of network traffic (e.g., passively) and analyze the network traffic. The traffic monitor component 1306 may further be able to access and analyze traffic logs from one or more entities (e.g., network device 104, system 150, or aggregation device 106) or from an entity being monitored. The traffic monitor component 1306 may further be able to access traffic analysis data associated with an entity being monitored, e.g., where the traffic analysis is performed by a third party system.

Network information determination component 1308 is operable for determining information about a network and entities of the network. Network information determination component 1308 may determine a data model for the network based on communications between entities, relationships between entities (e.g., client and server, SCADA server, engineering workstation, PLC, etc.), entity types, entity information, vertical, environment, common types of devices on the network, segments, etc., as described herein.

Event determination component 1310 is operable to determine events based on information (e.g., accessed via network communication interface 1302, external system interface 1304, etc.). The events may be determined from alerts, network logs, host or entity changes logs, etc., as described herein. In some embodiments, the events may be determined based on intrusion detection system functionality of event determination component 1310.

Correlation component 1312 is operable to determine one or more issued based on the events (e.g., determined by event determination component 1310 or accessed from another system), as described herein. The issues may be determined by correlation including a variety of algorithms including aggregation, event chaining, clustering, and pattern matching, as described herein. The correlations may be based on an event type, a source of a communication, a destination of a communication, and a protocol, as described herein. Correlation component 1312 may further determine a priority (e.g., based on severity) and category (e.g., security, operational, etc.), as described herein.

Display component 1314 is configured to optionally display one or more graphical user interfaces or other interfaces (e.g., command line interface) for depicting various information associated with entities or devices, issues, details associated with issues, event details, etc., as described herein.

Notification component 1316 is operable to initiate one or more notifications based on the results of monitoring communications or attributes of one or more entities (e.g., alerting of one or more issues, for instance, issues with a high priority, etc.), as described herein. The one or more notifications could also include an operational issue or a security issue, as described herein. The notification may be any of a variety of notifications, e.g., IT ticket, email, SMS, a HTTP notification, etc., as described herein.

Action component 1318 is operable for initiating or triggering one or more remediation actions or security actions according to one or more policies, e.g., based on an issue, as described herein. Action component 1318 may further be configured to perform other operations including checking compliance status, finding open ports, etc. Action component 1318 may restrict network access, signal a patch system or service, signal an update system or service, etc., as described herein. The action component 1318 may thus, among other things, invoke automatically patching, automatically updating, and automatically restrict network access of an entity (e.g., that has out-of-date software or based on access rule violation or attempted violation), automatic change of an entity to another network portion (e.g., VLAN), as described herein.

The actions may include restricting network access to a particular level (e.g., full, limited, or no network access), remediation actions (e.g., triggering patch systems or services, triggering update systems or services, triggering third party product action, etc.), informational actions (e.g., sending an email notification to a user or IT administrator or creating an IT ticket reflecting the level of compliance), and logging actions (e.g., logging or storing the compliance level).

Visualization component 1320 is operable to determine visual representations of issues and the associated entities (e.g., as shown in FIG. 4-11), as described herein. The visual representations may include graphs of entities and events associated with an issue at various points in time, as described herein. This may allow a user (e.g., analyst) to view the start of an issue and the progression of the issue over time.

The system 1300 may be software stored on a non-transitory computer readable medium having instructions encoded thereon that, when executed by a processing device, cause the processing device to access network traffic from a network and access a plurality of events associated with the network traffic. The instructions may further cause the processing device to determine an issue based on a correlation of a portion of the plurality of events. The issue represents an incident associated with the portion of the plurality of events. The correlation of the portion of the plurality of events is based on network specific information. The instructions may further cause the processing device to storing information associated with the issue including the portion of the plurality of events.

In some embodiments, the network specific information comprises at least one of information of communications of entities on the network, information of a relationship of entities of the network, or information of entity types of entities on the network. In various embodiments, the correlation of the portion of the plurality of events is based on at least one of an aggregation, clustering, pattern matching, event chaining, risk posture, or vulnerabilities. In some embodiments, the instructions may further cause the processing device to determine a category associated with the issue, wherein the category associated with the issue comprises at least one of security or operational. In various embodiments, the instructions may further cause the processing device to determine a priority associated with the issue, wherein the priority associated with the issue comprises at least one of critical, high, medium, low, or informational. In some embodiments, the instructions may further cause the processing device to access information associated with the network, wherein the information associated with the network comprises a model comprising one or more relationships of entities of the network.

In various embodiments, at least one of the events is determined by an intrusion detection system. In some embodiments, the correlation is based on at least one of an event type, a source of a communication, or a destination of the communication. In various embodiments, at least one of the events is associated with an operational technology (OT) entity. In some embodiments, the instructions may further cause the processing device to determine the plurality of events associated with the network traffic.

Figure 14:
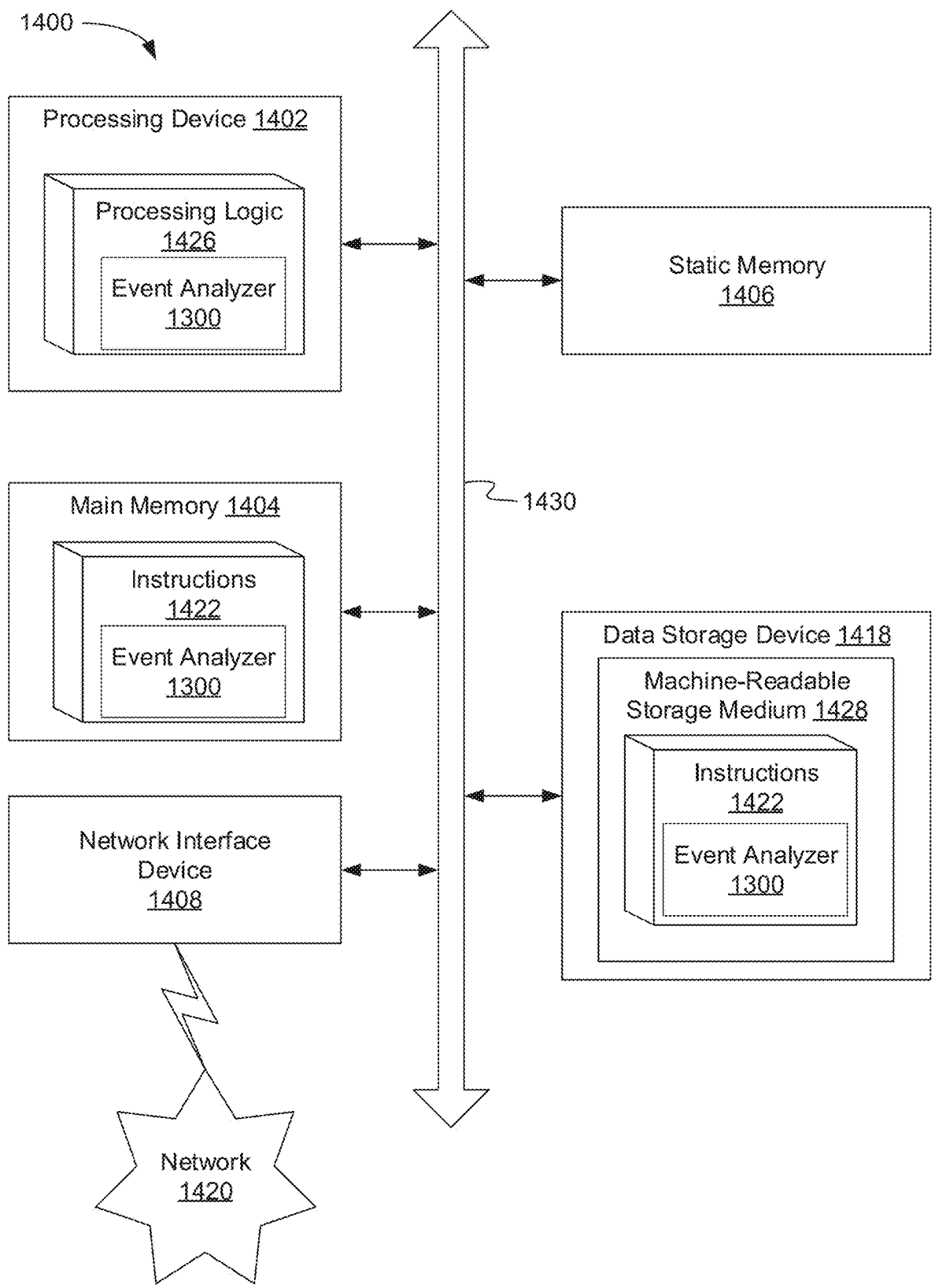
FIG. 14 is a block diagram illustrating an example computer system, in accordance with one implementation of the present disclosure.

FIG. 14 is a block diagram illustrating an example computer system, in accordance with one implementation of the present disclosure. FIG. 14 illustrates a diagrammatic representation of a machine in the example form of a computer system 1400 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 1400 may be representative of a server, such as network monitor device 102 running event analyzer 1300 to determine one or more issues based on a plurality of events, as described herein.

The exemplary computer system 1400 includes a processing device 1402, a main memory 1404 (e.g., read-only memory (ROM), flash memory, dynamic random access memory (DRAM), a static memory 1406 (e.g., flash memory, static random access memory (SRAM), etc.), and a data storage device 1418, which communicate with each other via a bus 1430. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 1402 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1402 may also be one or more special-purpose processing devices such as an application specific integrated circuit (ASIC), a field programmable gate array (FPGA), a digital signal processor (DSP), network processor, or the like. The processing device 1402 is configured to execute processing logic 1426, which may be one example of event analyzer 1300 shown in FIG. 13, for performing the operations and steps discussed herein.

The data storage device 1418 may include a machine-readable storage medium 1428, on which is stored one or more set of instructions 1422 (e.g., software) embodying any one or more of the methodologies of operations described herein, including instructions to cause the processing device 1402 to execute event analyzer 1300. The instructions 1422 may also reside, completely or at least partially, within the main memory 1404 or within the processing device 1402 during execution thereof by the computer system 1400; the main memory 1404 and the processing device 1402 also constituting machine-readable storage media. The instructions 1422 may further be transmitted or received over a network 1420 via the network interface device 1408.

The machine-readable storage medium 1428 may also be used to store instructions to perform a method for issue determination, as described herein. While the machine-readable storage medium 1428 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Reference throughout this specification to "one embodiment" or "an embodiment" means that a particular feature, structure, or characteristic described in connection with the embodiments is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

Additionally, some embodiments may be practiced in distributed computing environments where the machine-readable medium is stored on and or executed by more than one computer system. In addition, the information transferred between computer systems may either be pulled or pushed across the communication medium connecting the computer systems.

Embodiments of the claimed subject matter include, but are not limited to, various operations described herein. These operations may be performed by hardware components, software, firmware, or a combination thereof.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "of". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

What is claimed is:

1. A method comprising:

accessing a plurality of events associated with a network;

determining, by a processing device, an issue based on a correlation of a portion of the plurality of events, wherein the issue represents an incident associated with the portion of the plurality of events, and wherein the correlation of the portion of the plurality of events is based on information associated with the network and at least in part on an event type of the portion of the plurality of events;

determining a priority associated with the issue at least based on the event type of the portion of the plurality of events wherein a first event type that is associated with an operational technology (OT) entity has a higher priority than a second event type that is not associated with the OT entity;
categorizing the issue as one of: a security issue or an operational issue;
displaying the issue to a display of a first device; and
in response to the issue being categorized as the operational issue, transmitting the operational issue to a second device.

2. The method of claim 1, wherein the information associated with the network comprises information of communications of entities on the network.

3. The method of claim 1, wherein the correlation of the portion of the plurality of events is based on at least one of: an aggregation, a clustering or a pattern matching.

4. The method of claim 1 wherein the correlation of the portion of the plurality of events is based on at least one of: an exposure to threats, or a risk posture.

5. The method of claim 1, wherein the information associated with the network comprises at least one of: a device criticality, or a relationship between entities of the network.

6. The method of claim 1, wherein the information associated with the network comprises a model indicating the one or more relationships between entities of the network.

7. The method of claim 1, wherein at least one of the plurality of events is determined by an intrusion detection system.

8. The method of claim 1, wherein at least one of the plurality of events is associated with a network relationship or a communication pattern over the network.

9. The method of claim 1, wherein at least one of the plurality of events is determined based on an alert, a network log entry, a reconfiguration of a network controller, or a change log entry.

10. The method of claim 1, wherein the correlation is further based on at least one of a source of a communication or a destination of the communication.

11. A system comprising:
a memory; and
a processing device, operatively coupled to the memory, to:
accessing a plurality of events associated with a network;
determine, by the processing device, an issue based on a correlation of a portion of the plurality of events, wherein the issue represents an incident associated with the portion of the plurality of events, and wherein the correlation of the portion of the plurality of events is based on information associated with the network and at least in part on an event type of the portion of the plurality of events;
determine a priority associated with the issue at least based on the event type of the portion of the plurality of events wherein a first event type that is associated with an operational technology (OT) entity has a higher priority than a second event type that is not associated with the OT entity;
categorize the issue as one of: a security issue or an operational issue;
display the issue to a display of a first device; and
in response to the issue being categorized as the operational issue, transmit the operational issue to a second device.

12. The system of claim 11, wherein the information associated with the network comprises information of communications of entities on the network.

13. The system of claim 11, wherein the correlation of the portion of the plurality of events is based on at least one of: an aggregation, a clustering or a pattern matching.

14. The system of claim 11, wherein the correlation of the portion of the plurality of events is based on at least one of: an exposure to threats, or a risk posture.

15. The system of claim 11, wherein the information associated with the network comprises at least one of: a device criticality, or a relationship between entities of the network.

16. A non-transitory computer readable medium having instructions encoded thereon that, when executed by a processing device, cause the processing device to:
determine, by the processing device, an issue based on a correlation of a portion of the plurality of events, wherein the issue represents an incident associated with the portion of the plurality of events, and wherein the correlation of the portion of the plurality of events is based on information associated with the network and at least in part on an event type of the portion of the plurality of events;
determine a priority associated with the issue at least based on the event type of the portion of the plurality of events wherein a first event type that is associated with an operational technology (OT) entity has a higher priority than a second event type that is not associated with the OT entity;
categorize the issue as one of: a security issue or an operational issue;
display the issue to a display of a first device; and
in response to the issue being categorized as the operational issue, transmit the operational issue to a second device.

17. The non-transitory computer readable medium of claim 16, wherein the information associated with the network comprises information of communications of entities on the network.

18. The non-transitory computer readable medium of claim 16, wherein the correlation of the portion of the plurality of events is based on at least one of: an aggregation, a clustering or a pattern matching.

19. The non-transitory computer readable medium of claim 16, wherein the correlation of the portion of the plurality of events is based on at least one of: an exposure to threats, or a risk posture.

20. The non-transitory computer readable medium of claim 16, wherein the information associated with the network comprises at least one of: a device criticality, or a relationship between entities of the network.

* * * * *